US011875767B2

(12) United States Patent
Lakshminarayanan et al.

(10) Patent No.: US 11,875,767 B2
(45) Date of Patent: Jan. 16, 2024

(54) # SYNCHRONIZED MODE TRANSITION

(71) Applicant: QUALCOMM Incorporated, San Diego, CA (US)

(72) Inventors: Kamlesh Lakshminarayanan, San Diego, CA (US); Mark Andrew Roberts, Bloomfield Hills, MI (US); Jacob Jon Bean, Vista, CA (US); Walter Andres Zuluaga, San Diego, CA (US); Rogerio Guedes Alves, Macomb Township, MI (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/183,886

(22) Filed: Mar. 14, 2023

(65) Prior Publication Data

US 2023/0215413 A1 Jul. 6, 2023

Related U.S. Application Data

(63) Continuation of application No. 17/348,646, filed on Jun. 15, 2021, now Pat. No. 11,615,775.

(Continued)

(51) Int. Cl.
*G10K 11/175* (2006.01)
*H04R 1/10* (2006.01)

(52) U.S. Cl.
CPC ......... *G10K 11/175* (2013.01); *H04R 1/1016* (2013.01); *H04R 1/1041* (2013.01); *H04R 2460/01* (2013.01)

(58) Field of Classification Search
None
See application file for complete search history.

(56) References Cited

U.S. PATENT DOCUMENTS 10,432,773 B1 10/2019 Tong et al.
2007/0133832 A1 6/2007 DiGiovanni et al.
(Continued)

FOREIGN PATENT DOCUMENTS

WO 0217836 A1 3/2002
WO 2019191950 A1 10/2019
WO 2021050485 A1 3/2021

OTHER PUBLICATIONS

Anonymous: "ReSound GN Portfolio Overview Fall 2019," Aug. 1, 2019 (Aug. 1, 2019), 45 pages, XP055843750, Retrieved from the Internet: URL: https://www.oogvoororen.nl/uploads/documents/7100/m102734nlportfolio-overviewhr.pdf [retrieved on Sep. 22, 2021] "Synchronized Soft Switching"; p. 60.
(Continued)

*Primary Examiner* — Kenny H Truong
(74) *Attorney, Agent, or Firm* — QUALCOMM Incorporated; Espartaco Diaz Hidalgo

(57) ABSTRACT

Methods, systems, computer-readable media, devices, and apparatuses for synchronized mode transitions are presented. A first device configured to be worn at an ear includes a processor configured to, in a first contextual mode, produce an audio signal based on audio data. The processor is also configured to, in the first contextual mode, exchange a time indication of a first time with a second device. The time indication is exchanged based on detection of a first condition of a microphone signal. The processor is further configured to, at the first time, transition from the first contextual mode to a second contextual mode based on the time indication.

30 Claims, 13 Drawing Sheets

Related U.S. Application Data

(60) Provisional application No. 63/039,709, filed on Jun. 16, 2020.

(56) References Cited

U.S. PATENT DOCUMENTS

| | | | |
|---|---|---|---|
| 2016/0086595 | A1 | 3/2016 | Asada et al. |
| 2016/0336913 | A1 | 11/2016 | Kuruba Buchannagari et al. |
| 2017/0194020 | A1 | 7/2017 | Miller et al. |
| 2018/0192179 | A1 | 7/2018 | Liu et al. |
| 2020/0077175 | A1 | 3/2020 | Okuda |
| 2020/0320972 | A1 | 10/2020 | Hoby et al. |
| 2021/0390941 | A1 | 12/2021 | Lakshminarayanan |

OTHER PUBLICATIONS

Bluetooth SIG: “Sections 2.1 “Message Transport” and 2.2 “Synchronization” “In: ”Bluetooth Specification Version 4.0 [vol. 2],” (2 General Rules), Jun. 30, 2010 (Jun. 30, 2010), Bluetooth SIG, XP055843725, pp. 212-213, Retrieved from the Internet: URL: https://www.bluetooth.org/docman/handlers/downloaddoc.ashx?doc_id=229737 section 2.2 Synchronization.

International Search Report and Written Opinion—PCT/US2021/037634—ISA/EPO—dated Oct. 1, 2021.

SYNCHRONIZED MODE TRANSITION

CROSS-REFERENCE TO RELATED APPLICATIONS

The present application claims priority from and is a continuation of pending U.S. patent application Ser. No. 17/348,646, filed Jun. 15, 2021, and entitled "SYNCHRONIZED MODE TRANSITION," which claims priority from U.S. Provisional Patent Application No. 63/039,709, filed Jun. 16, 2020, entitled "SYNCHRONIZED MODE TRANSITION," the content of each of which is incorporated herein by reference in its entirety.

FIELD

Aspects of the disclosure relate to audio signal processing.

DESCRIPTION OF RELATED ART

Hearable devices or "hearables" (also known as "smart headphones," "smart earphones," or "smart earpieces") are becoming increasingly popular. Such devices, which are designed to be worn over the ear or in the ear, have been used for multiple purposes, including wireless transmission and fitness tracking. A hearable typically includes a loudspeaker to reproduce sound to a user's ear and a microphone to sense the user's voice and/or ambient sound. In some cases, a user can change an operational mode (e.g., noise cancellation enabled or disabled) of a hearable. Having the hearable dynamically change operational mode independently of user input can be more user friendly. For example, the hearable can automatically enable noise cancellation in a noisy environment. However, if the user is wearing multiple hearables, lack of synchronization between the hearables when changing modes can have an adverse impact on the user experience. For example, if the user is wearing one hearable on each ear and only one of the hearables enables noise cancellation, the user can have an unbalanced auditory experience.

SUMMARY

According to one implementation of the present disclosure, a first device is configured to be worn at an ear. The first device includes a processor configured to, in a first contextual mode, produce an audio signal based on audio data. The processor is also configured to, in the first contextual mode, exchange a time indication of a first time with a second device. The processor is further configured to, at the first time, transition from the first contextual mode to a second contextual mode based on the time indication.

According to another implementation of the present disclosure, a method includes producing, at a first device in a first contextual mode, an audio signal based on audio data. The method also includes exchanging, in the first contextual mode, a time indication of a first time with a second device. The method further includes transitioning, at the first device, from the first contextual mode to a second contextual mode at the first time. The transition is based on the time indication.

According to another implementation of the present disclosure, a non-transitory computer-readable medium stores instructions that, when executed by a processor, cause the processor to produce, in a first contextual mode, an audio signal based on audio data. The non-transitory computer-readable medium also stores instructions that, when executed by the processor, cause the processor to exchange, in the first contextual mode, a time indication of a first time with a device. The non-transitory computer-readable medium further stores instructions that, when executed by the processor, cause the processor to transition from the first contextual mode to a second contextual mode at the first time. The transition is based on the time indication.

According to another implementation of the present disclosure, an apparatus includes means for producing an audio signal based on audio data. The audio signal is produced in a first contextual mode. The apparatus also includes means for exchanging a time indication of a first time with a device, the time indication exchanged in the first contextual mode. The apparatus further includes means for transitioning from the first contextual mode to a second contextual mode at the first time. The transition is based on the time indication.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

Aspects of the disclosure are illustrated by way of example. In the accompanying figures, like reference numbers indicate similar elements.

DETAILED DESCRIPTION

The principles described herein may be applied, for example, to synchronize a transition from one contextual mode to another among two or more devices in a group. In some examples, such principles can be applied for elimination or reduction of active noise cancellation (ANC) self-noise in quiet environments. As a result, a user may perceive time-synchronized behavior on both hearables (e.g., earbuds) similar to a wired stereo device. In some examples, these principles can be applied to support coordination of adaptive ANC. Use of extremely high quality audio codecs, conservative ANC performance, and wired earbuds controlled by a single digital computing entity may be supported. In some examples, a solution as described herein can be implemented on a chipset.

Several illustrative configurations are described below with reference to the accompanying drawings, which form a part hereof. While particular configurations, in which one or more aspects of the disclosure may be implemented, are described below, other configurations may be used and various modifications may be made without departing from the scope of the disclosure or the spirit of the appended claims.

Figure 14:
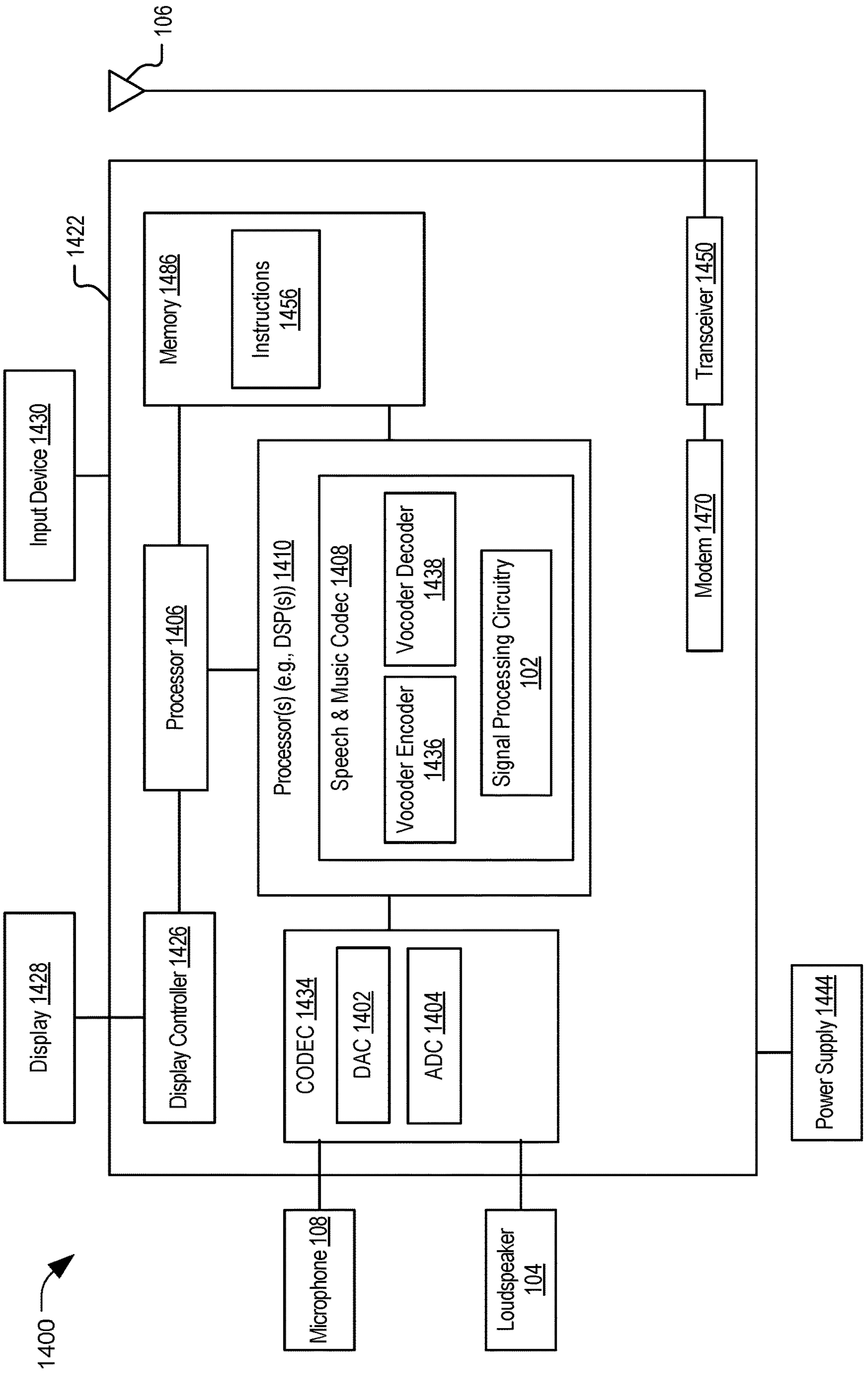
FIG. 14 is a block diagram of a particular illustrative example of a device that is operable to perform synchronized mode transitions, in accordance with some examples of the present disclosure.

In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 14 depicts a device 1400 including one or more processors ("processor(s)" 1410 of FIG. 14), which indicates that in some implementations the device 1400 includes a single processor 1410 and in other implementations the device 1400 includes multiple processors 1410. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Figure 1A:
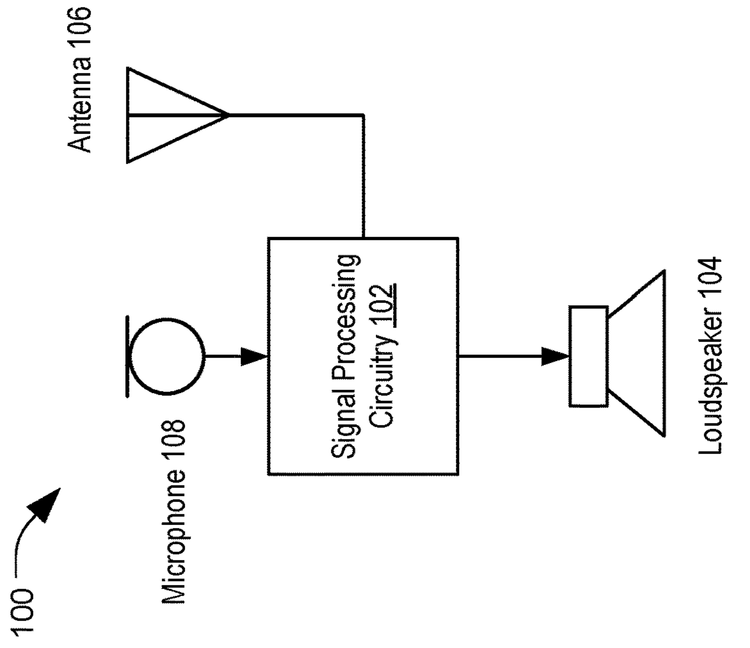
FIG. 1A is a block diagram of an illustrative aspect of a hearable, in accordance with some examples of the present disclosure.

Referring to FIG. 1A, a hearable 100 operable to perform synchronized mode transition is shown. The hearable 100 includes a loudspeaker 104 configured to reproduce sound to a user's ear when the user is wearing the hearable 100. The hearable 100 also includes a microphone 108. In a particular aspect, the microphone 108 is configured to capture the user's voice and/or ambient sound. The hearable 100 further includes signal processing circuitry 102. In a particular aspect, the signal processing circuitry 102 is configured to communicate with another device (e.g., a smartphone or another hearable). For example, the hearable 100 includes an antenna 106 coupled to the signal processing circuitry 102 and the signal processing circuitry 102 is configured to communicate with another device via the antenna 106. In some aspects, the hearable 100 can also include one or more sensors: for example, to track heart rate, to track physical activity (e.g., body motion), or to detect proximity. In a particular aspect, the hearable 100 includes an earphone, an earbud, a headphone, or a combination thereof.

Figure 1B:
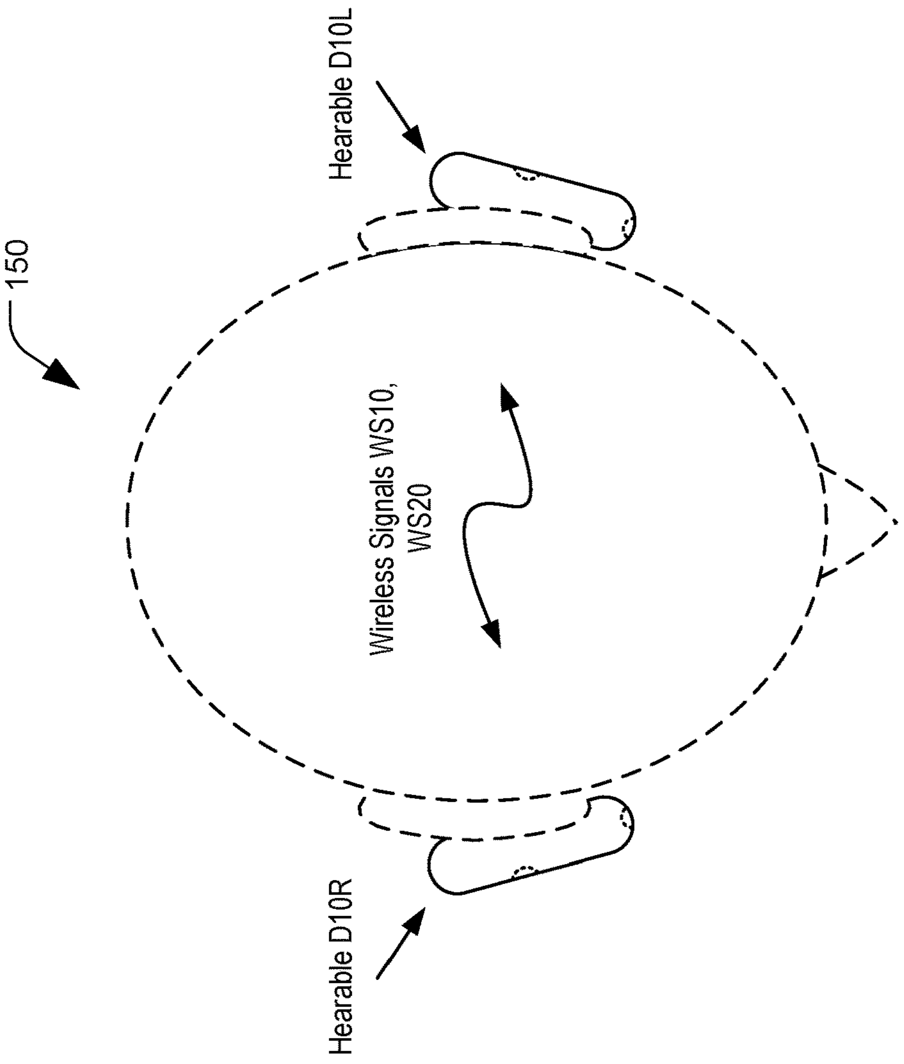
FIG. 1B is a diagram of an illustrative aspect of communication among a pair of hearables, in accordance with some examples of the present disclosure.

Referring to FIG. 1B, hearables D10L, D10R worn at each ear of a user 150 are shown. In a particular aspect, the hearable D10L, the hearable D10R, or both, include one or more components described with reference to the hearable 100 of FIG. 1A.

In some aspects, the hearables D10L, D10R are configured to communicate audio and/or control signals to each other wirelessly (e.g., by Bluetooth® (e.g., a registered trademark of the Bluetooth Special Interest Group (SIG), Kirkland, WA) or by near-field magnetic induction (NFMI)). For example, the hearable D10L is configured to send a wireless signal WS10 to the hearable D10R, and the hearable D10R is configured to send a wireless signal WS20 to the hearable D10L. In some cases, a hearable 100 includes an inner microphone that is configured to be located inside an ear canal when the hearable 100 is worn by the user 150. For example, such a microphone may be used to obtain an error signal (e.g., feedback signal) for ANC. In some aspects, active noise cancellation is also referred to as active noise reduction. A hearable 100 can be configured to communicate wirelessly with a wearable device or "wearable," which may, for example, send a volume level or other control command. Examples of wearables include (in addition to hearables) watches, head-mounted displays, headsets, fitness trackers, and pendants. WS10 and WS12 are described as wireless signals as an illustrative example. In some examples, WS10 and WS12 correspond to wired signals.

Figure 2:
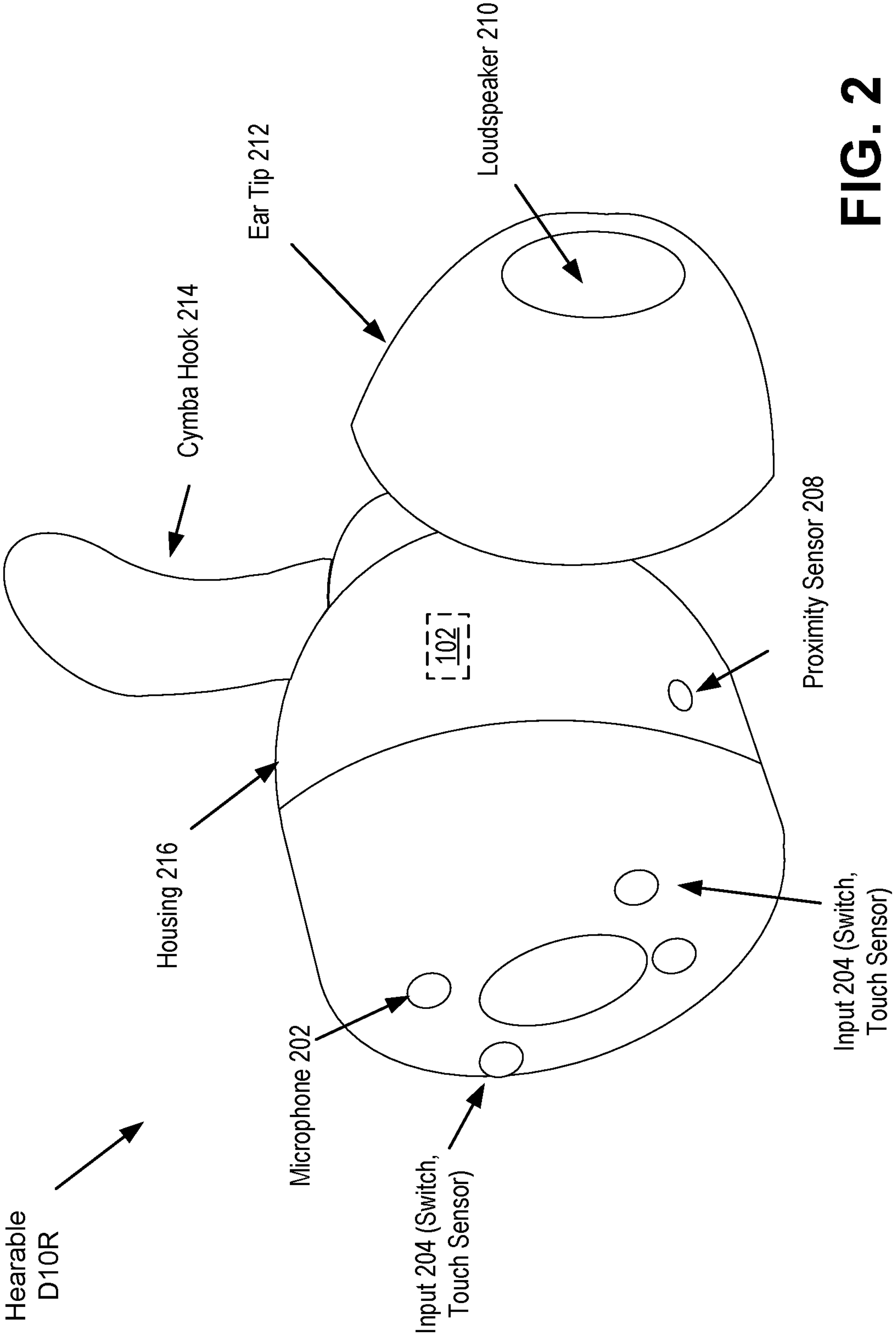
FIG. 2 is a diagram of an illustrative aspect of a hearable configured to be worn at a right ear of a user, in accordance with some examples of the present disclosure.

Referring to FIG. 2, an illustrative implementation of the hearable D10R is shown. In a particular aspect, the hearable D10R is configured to be worn at a right ear of a user.

In a particular aspect, the hearable D10R corresponds to the hearable 100 of FIG. 1A. For example, the hearable D10R includes one or more components described with reference to the hearable 100. To illustrate, the signal processing circuitry 102 is integrated in the hearable D10R and is illustrated using dashed lines to indicate an internal component that is not generally visible to a user of the hearable D10R.

The hearable D10R includes one or more loudspeakers 210, an ear tip 212 configured to provide passive acoustic isolation, or both. In some examples, the hearable D10R includes a cymba hook 214 (e.g., a hook or wing) configured to secure the hearable D10R in the cymba and/or pinna of the ear. In a particular aspect, the hearable D10R includes at least one of a housing 216, one or more inputs 204 (e.g., switches and/or touch sensors) for user control, one or more additional microphones 202 (e.g., to sense an acoustic error signal), or one or more proximity sensors 208 (e.g., to detect that the device is being worn). In a particular aspect, the one or more loudspeakers 210 are configured to render an anti-noise signal in a first contextual mode, and configured to refrain from rendering the anti-noise signal in a second contextual mode.

In a particular aspect, the hearable D10L includes copies of one or more components described with reference to the hearable D10R. For example, the hearable D10L includes a copy of the signal processing circuitry 102, the microphone 202, the input 204, the proximity sensor 208, the housing 216, the cymba hook 214, the ear tip 212, the one or more loudspeakers 210, or a combination thereof. In a particular aspect, the ear tip 212 of the hearable D10R is on a first side of the housing 216 (e.g., 90 degrees relative to the cymba hook 214) of the hearable D10R and the ear tip 212 of the hearable D10L is on a second side of the housing 216 (e.g., −90 degrees relative to the cymba hook 214) of the hearable D10L.

In some implementations, a transition from one contextual mode to another can be synchronized among two or more devices (e.g., hearables 100) in a group. Time information for synchronization can be shared between two devices (e.g., the hearables 100 worn at a user's left and right ears, such that the user perceives time-synchronized behavior on both earbuds similar to a wired stereo device) and/or shared among many hearables 100 (e.g., earbuds or personal audio devices).

Figure 3A:
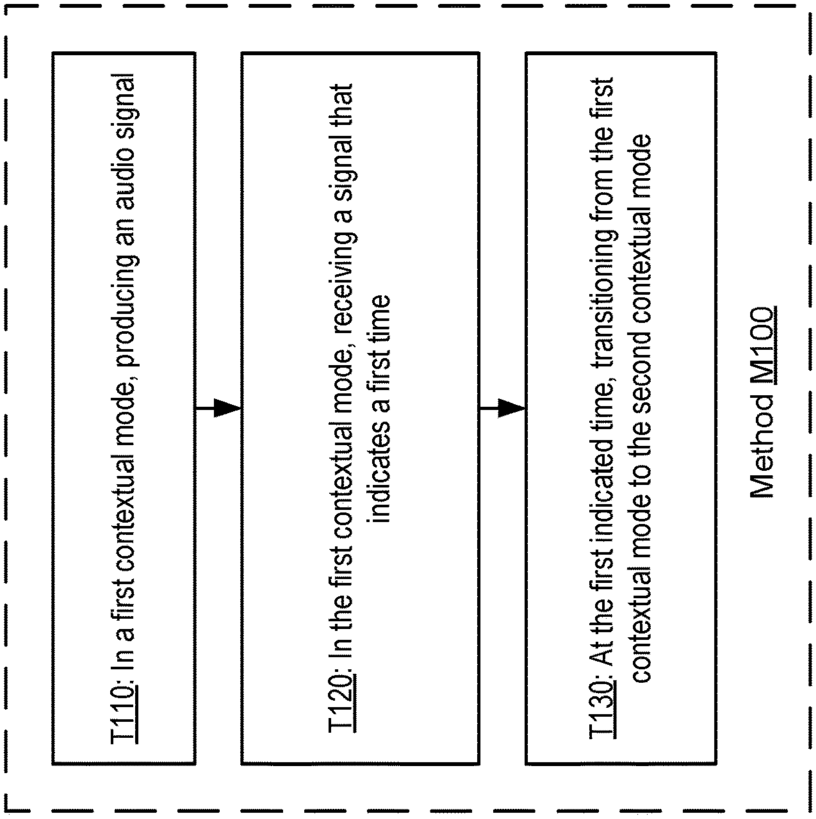
FIG. 3A is a flowchart of an illustrative aspect of a method of performing synchronized mode transitions, in accordance with some examples of the present disclosure.

Referring to FIG. 3A, a method M100 of performing synchronized mode transitions is shown. In a particular aspect, one or more operations of the method M100 are performed by the signal processing circuitry 102 of FIG. 1A.

The method M100 includes tasks T110, T120, and T130. The task T110 includes, in a first contextual mode, producing an audio signal. For example, the signal processing circuitry 102 of FIG. 1A, in a first contextual mode, produces an audio signal based on audio data. In some aspects, the audio data includes stored audio data or streamed audio data. Examples of the produced audio signal can include a far-end speech signal, a music signal decoded from a bitstream, and/or an ANC anti-noise signal (e.g., to cancel vehicle sounds for a passenger of a vehicle).

The task T120 includes, in the first contextual mode, receiving a signal that indicates a first time. For example, the signal processing circuitry 102 of FIG. 1A, in the first contextual mode, receives a wireless signal (WS) via the antenna 106. The wireless signal indicates a first time. In an illustrative example, the hearable D10R receives the wireless signal WS10 in a first contextual mode, and the wireless signal WS10 indicates a first time.

The task T130 includes, at the first indicated time, transitioning from the first contextual mode to a second contextual mode. For example, the signal processing circuitry 102 of FIG. 1A transitions from the first contextual mode to a second contextual mode at the first time. In the second contextual mode, production of the audio signal may be paused or otherwise disabled at the signal processing circuitry 102.

In some examples, the first contextual mode includes one of an ANC enabled mode, a full ANC mode, a partial ANC mode, an ANC disabled mode, or a transparency mode, and the second contextual mode includes another of the ANC enabled mode, the full ANC mode, the partial ANC mode, the ANC disabled mode, or the transparency mode. In a particular aspect, the first contextual mode corresponds to a first operational mode of an ANC filter, and the second contextual mode corresponds to a second operational mode of the ANC filter that is distinct from the first operational mode. In some aspects, as further explained with reference to FIG. 4, the first contextual mode includes one of an ANC mode 402 (e.g., an ANC enabled mode) or a quiet mode 404 (e.g., an ANC disabled mode), and the second contextual mode includes the other of the ANC mode 402 or the quiet mode 404.

In a particular implementation, a device (e.g., the hearable 100) includes a memory configured to store audio data, and a processor (e.g., the signal processing circuitry 102) configured to receive the audio data from the memory and to perform the method M100. In a particular implementation, an apparatus includes means for performing each of the tasks T110, T120, and T130 (e.g., as software executing on hardware). In a particular aspect, the means for performing each of the tasks T110, T120, and T130 includes the signal processing circuitry 102, the hearable 100, the hearable D10R, the hearable D10L, a processor, one or more other circuits or components configured to perform each of the tasks T110, T120, and T130, or any combination thereof. In a particular implementation, a non-transitory computer-readable storage medium includes code (e.g., instructions) which, when executed by at least one processor, causes the at least one processor to perform the method M100.

In one particular example of an extended use case in which devices (e.g., signal processing circuitry 102 of hearables 100) perform the method M100, several personal audio devices (e.g., the hearables 100) on a broadcast network (e.g., a Bluetooth Low Energy (BLE) network) perform media streaming and/or playback to produce audio signals. The devices (e.g., the signal processing circuitry 102 of the hearables 100) receive a broadcast signal indicating a mode change at an indicated time, and the devices transition synchronously at the indicated time, in response to the broadcast signal, into a second contextual mode in which far-end audio and media streaming and playback are suspended and ambient sound is passed through (also called "transparency mode"). To support such synchronous operation, the devices (e.g., the signal processing circuitry 102 of the hearables 100) may also receive time reference signals from a shared clock, such as a network clock.

One application of this extended use case is in an airport or railway station, when a broadcaster has a terminal or track announcement to make. At a time t0, the broadcaster publishes a message requesting all earbud devices (e.g., the hearables 100) in a group to enter a transparency mode at a future time t1. At time t1, all devices (e.g., the signal processing circuitry 102 of the hearables 100) in the broadcast group transition to the transparency mode, pausing personal media playback, and the broadcaster starts announcement of terminal arrivals and departures. At time t2 when the announcements have completed, the broadcaster publishes a message requesting all earbud devices (e.g., the hearables 100) in the group to resume their prior state (e.g., to clear transparency mode), and each device (e.g., the signal processing circuitry 102 of the hearables 100) in the broadcast group resumes its state prior to time t1 (e.g., clears transparency mode and resumes personal media playback).

Another application of this extended use case is at a music concert. At a time t0 prior to the start of a performance, a broadcaster of the venue publishes a message to request all personal audio devices (e.g., the hearables 100) in a group to enter a controlled transparency mode at a future time t1. In a particular aspect, the controlled transparency mode corresponds to a mode in which the user can listen to the concert, but at a volume level that is restricted by a user-specified maximum volume level to protect the user's hearing. The message to enter the controlled transparency mode can be extended to include additional information; alternatively or additionally, such additional information may be broadcast during the event (e.g., to take effect synchronously across the devices at an indicated future time). In a particular aspect, the additional information indicates some aspect that is requested by the performer(s) and/or may support an experience for the audience as indicated by the performer(s). In one example, the additional information includes information describing a requested audio equalization shape, emphasis (e.g., to emphasize certain frequencies) and/or deemphasis (e.g., to attenuate certain frequencies). In another example, the additional information includes information indicating and/or describing one or more requested audio effects (e.g., to add a flange effect, to add an echo, etc.).

At the time t1, all devices (e.g., the signal processing circuitry 102 of the hearables 100) in the broadcast group transition to the controlled transparency mode (e.g., pausing personal media playback), and the performance begins. When the performance has ended, the broadcaster publishes a message to request all personal audio devices (e.g., the hearables 100) in the group to resume their prior state (e.g., to exit the controlled transparency mode) at a time t2, and at the designated time t2, each device (e.g., the signal processing circuitry 102 of the hearables 100) in the broadcast group resumes its state prior to the time t1 (e.g., exits controlled transparency mode and resumes personal media playback). In another example, a device (e.g., the signal processing circuitry 102 of a hearable 100) exits the controlled transparency mode at the time t2 to resume an ANC mode for ambient crowd noise cancellation.

A further example of this extended use case is a group tour at a museum (or, for example, in a city street), in which a display (e.g., a painting or sculpture) has a camera with a wireless audio broadcaster. The camera can be configured to detect when multiple users enter the field of vision of the camera, and the camera and/or the broadcaster can be further configured to detect that the users are registered to a tour group (e.g., by device identification and/or facial recognition). In response to this trigger condition (e.g., detecting users registered to a tour group), the broadcaster can broadcast background audio with history about the display. The trigger condition may be further defined to include detecting that a minimum number of the users have been gazing at the display for at least a configurable amount of time (for example, fifteen, twenty, or thirty seconds). In such a scenario, upon detection that the trigger condition is satisfied, the broadcast audio device associated with the display may automatically send a request to all of the user devices (e.g., hearables 100, such as earbuds, extended reality (XR) glasses, etc.) to transition to an active noise cancellation mode synchronously at a time t1, so that the listeners can focus on the audio content at some future time t2 (for example, two or three seconds after the time t1). At the time t2, the broadcaster begins to present the audio content (e.g., background history) to all of the devices (e.g., the hearables 100) at the same time, so that the group members are listening to the same content together; but each on a personal audio device. Once the background audio history is complete, the broadcast audio device sends a message to indicate that all devices (e.g., the hearables 100) in that network can transition to a transparency mode at a future time t3 (e.g., in one-tenth, one-quarter, one-half, or one second), so that the users can continue to talk to each other.

Figure 3B:
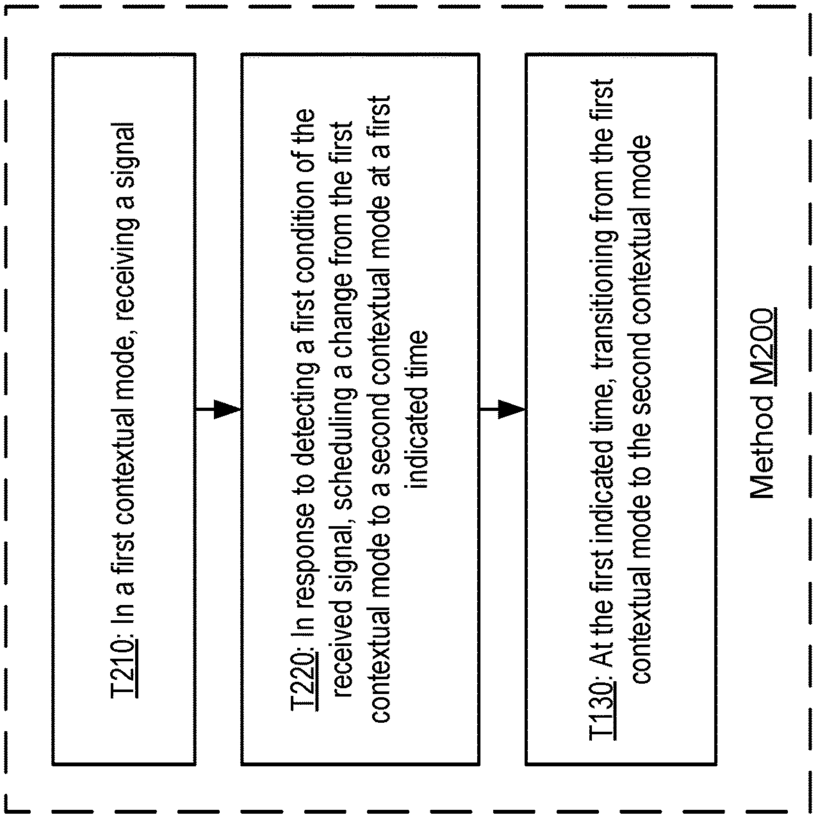
FIG. 3B is a flowchart of an illustrative aspect of a method of performing synchronized mode transitions, in accordance with some examples of the present disclosure.

Referring to FIG. 3B, a method M200 of performing synchronized mode transitions is shown. In a particular aspect, one or more operations of the method M200 are performed by the signal processing circuitry 102 of FIG. 1A.

The method M200 includes tasks T210, T220, and T130. The task T210 includes, in a first contextual mode, receiving a signal. For example, the signal processing circuitry 102 of FIG. 1A receives a signal. The task T220 includes, in response to detecting a first condition of the received signal, scheduling a change from the first contextual mode to a second contextual mode at a first indicated time, which may be indicated by the received signal or another signal. Task T130 is as described with reference to FIG. 3A. In one example, the signal received during performance of the task T210 in the first contextual mode is a wireless signal, and the first condition is that the signal carries a command (e.g., a broadcast command as described above). In another example, the signal received during performance of the task T210 in the first contextual mode is a microphone signal, the first indicated time is indicated by another signal, and the first condition is an environmental noise condition of the microphone signal as described below.

In a particular implementation, a device (e.g., a hearable 100) includes a memory configured to store audio data and a processor (e.g., the signal processing circuitry 102) configured to receive the audio data from the memory and to perform the method M200. In a particular implementation, an apparatus includes means for performing each of the tasks T210, T220, and T130 (e.g., as software executing on hardware). In a particular aspect, the means for performing each of the tasks T210, T220, and T130 includes the signal processing circuitry 102, the hearable 100, the hearable D10R, the hearable D10L, a processor, one or more other circuits or components configured to perform each of the tasks T210, T220, and T130, or any combination thereof. In a particular implementation, a non-transitory computer-readable storage medium includes code (e.g., instructions) which, when executed by at least one processor, causes the at least one processor to perform the method M200.

The principles described herein may be applied, for example, to a hearable 100 (e.g., a headset, or other communications or sound reproduction device) that is configured to perform an ANC operation ("ANC device"). Active noise cancellation actively reduces acoustic noise in the air by generating a waveform that is an inverse form of a noise wave (e.g., having the same level and an inverted phase), also called an "antiphase" or "anti-noise" waveform. An ANC system generally uses one or more microphones to pick up an external noise reference signal, generates an anti-noise waveform from the noise reference signal, and reproduces the anti-noise waveform through one or more loudspeakers. This anti-noise waveform interferes destructively with the original noise wave to reduce the level of the noise that reaches the ear of the user.

Active noise cancellation techniques may be applied to a hearable 100 (e.g., a personal communication device, such as a cellular telephone, and a sound reproduction device, such as headphones) to reduce acoustic noise from the surrounding environment. In such applications, the use of an ANC technique may reduce the level of background noise that reaches the ear by up to twenty decibels or more while delivering useful sound signals, such as music and far-end voices. In headphones for communications applications, for example, the equipment usually has a microphone and a loudspeaker, where the microphone is used to capture the user's voice for transmission and the loudspeaker is used to reproduce the received signal. In such case, the microphone may be mounted on a boom or on an earcup and/or the loudspeaker may be mounted in an earcup or earplug.

In some implementations, an ANC device (e.g., the signal processing circuitry 102 of FIG. 1A) includes a microphone arranged to capture a reference acoustic noise signal ("x") from the environment and/or a microphone arranged to capture an acoustic error signal ("e") after the noise cancellation. In either case, the ANC device (e.g., the signal processing circuitry 102) uses the microphone input to estimate the noise at that location and produces an anti-noise signal ("y") which is a modified version of the estimated noise. The modification includes filtering with phase inversion and can also include gain amplification.

In a particular aspect, an ANC device (e.g., the signal processing circuitry 102) includes an ANC filter which generates an anti-noise signal that is matched with the acoustic noise in amplitude and is opposite to the acoustic noise in phase. The reference signal x can be modified by passing the reference signal x through an estimate of the secondary path (i.e., the electro-acoustic path from the ANC filter output through, for example, the loudspeaker and the error microphone) to produce an estimated reference x' to be used for ANC filter adaptation. The ANC filter is typically adapted according to an implementation of a least-mean-squares (LMS) algorithm, which class includes filtered-reference ("filtered-X") LMS, filtered-error ("filtered-E") LMS, filtered-U LMS, and variants thereof (e.g., subband LMS, step size normalized LMS, etc.). Signal processing operations such as time delay, gain amplification, and equalization or lowpass filtering can be performed to achieve optimal noise cancellation.

In some examples, the ANC filter is configured to high-pass filter the signal (e.g., to attenuate high-amplitude, low-frequency acoustic signals). Additionally or alternatively, in some examples, the ANC filter is configured to low-pass filter the signal (e.g., such that the ANC effect diminishes with frequency at high frequencies). Because the anti-noise signal should be available by the time the acoustic noise travels from the microphone to the actuator (i.e., the loudspeaker), the processing delay caused by the ANC filter should not exceed a very short time (e.g., about thirty to sixty microseconds).

In a quiet environment (for example, an office), an ANC device (e.g., the signal processing circuitry 102) can create the perception of increasing noise, rather than reducing noise, by amplifying the electrical noise floor of the system ("self-noise") to a point where the noise becomes audible. In some examples, an ANC device (e.g., the signal processing circuitry 102) is configured to enter a "quiet mode" when a quiet environment is detected. In a particular aspect, the "quiet mode" refers to an ANC disabled mode. During the quiet mode, output of the anti-noise signal from the loudspeaker is reduced (for example, by adding a version of the reference signal x to the error signal e) and may even be disabled (e.g., by deactivating the ANC filter). Such a mode may reduce or even eliminate ANC self-noise in a quiet environment. In some examples, the ANC device (e.g., the signal processing circuitry 102) is configured to leave the quiet mode when a noisy environment (e.g., a lunch room) is detected.

Figure 4A:
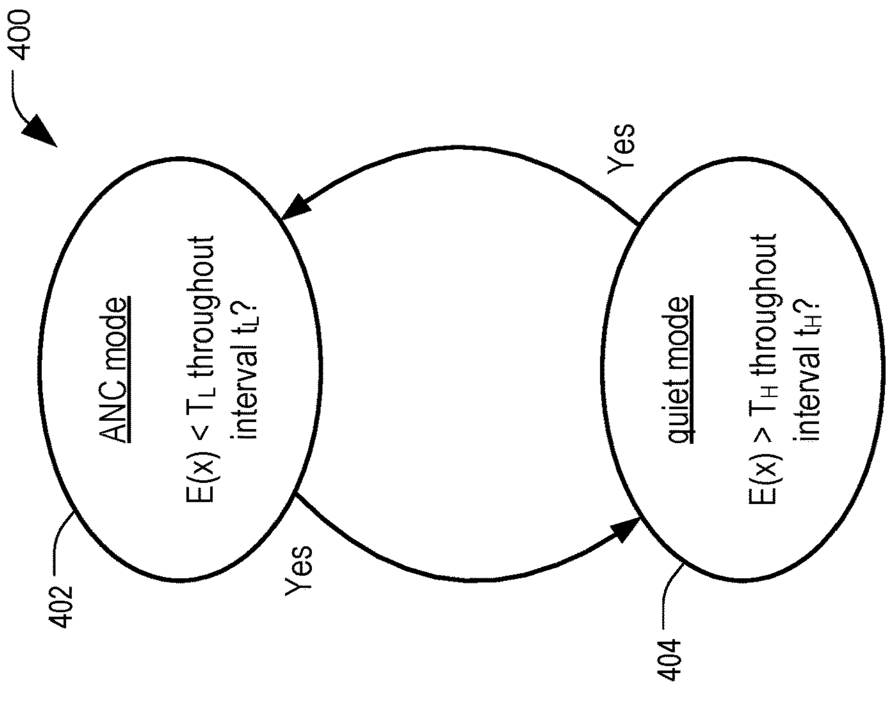
FIG. 4A is a state diagram of an illustrative aspect of operation of an active noise cancellation (ANC) device, in accordance with some examples of the present disclosure.

Referring to FIG. 4A, a state diagram 400 of an illustrative aspect of operation of an ANC device (e.g., the signal processing circuitry 102 of FIG. 1A) is shown. In a particular aspect, the ANC device (e.g., the signal processing circuitry 102) is configured to operate in either an ANC mode 402 (i.e., output of the anti-noise signal from the loudspeaker is enabled) or a quiet mode 404 (i.e., output of the anti-noise signal from the loudspeaker is disabled). For example, the ANC mode 402 corresponds to a first contextual mode of the signal processing circuitry 102 and the quiet mode 404 corresponds to a second contextual mode of the signal processing circuitry 102.

The device (e.g., the signal processing circuitry 102) is configured to transition among a plurality of contextual modes based on detecting various environmental noise conditions. For example, the device (e.g., the signal processing circuitry 102), in the ANC mode 402, compares a measure (E(x)) of an environment noise level (e.g., energy of the reference signal x) to a first threshold ($T_L$). In a particular aspect, the first threshold ($T_L$) corresponds to a low threshold value (e.g., minus eighty decibels (−80 dB)). If the measure of the environment noise level (e.g., the energy) remains below (alternatively, does not exceed) the first threshold ($T_L$) for at least a first time period ($t_L$) (e.g., fifteen seconds), then the device (e.g., the signal processing circuitry 102) detects a first environmental noise condition (e.g., a quiet condition). The device (e.g., the signal processing circuitry 102), in response to detecting the first environmental noise condition, transitions to operation in the quiet mode 404 (e.g., by powering down the ANC filter or otherwise disabling output of the anti-noise signal from the loudspeaker).

In the quiet mode 404, the ANC device (e.g., the signal processing circuitry 102) compares the measure (E(x)) of the environment noise signal (e.g., the energy of the reference signal x) to a second threshold ($T_H$). In a particular aspect, the second threshold ($T_H$) corresponds to a high threshold value (e.g., minus seventy decibels (−70 dB)) that is greater than the low threshold value corresponding to the first threshold ($T_L$). If the measure of the environment noise level (e.g., the energy) remains above (alternatively, does not fall below) the second threshold ($T_H$) for a second time period ($t_H$) (e.g., five seconds), then the device (e.g., the signal processing circuitry 102) detects a second environmental noise condition (e.g., a noisy change condition). The device (e.g., the signal processing circuitry 102), in response to detecting the second environmental noise condition, transitions to operation in the ANC mode 402 (e.g., by activating the ANC filter or otherwise enabling output of the anti-noise signal from the loudspeaker).

As described in the example above, the ANC device (e.g., the signal processing circuitry 102) can be configured to transition from one mode to another only after the threshold condition (e.g., an environmental noise condition) has persisted for some time period, and the time period can be different for different types of transitions. For example, a quiet condition (e.g., E(x)<TO may have to persist for a longer period of time before the signal processing circuitry 102 transitions to the quiet mode 404, than a noisy change condition (e.g., E(x)>Tx) has to persist before the signal processing circuitry 102 transitions to the ANC mode 402. To illustrate, the first time period ($t_L$) can be greater than the second time period ($t_H$). In some examples, the first time period ($t_L$) can be less than the second time period ($t_H$). In other examples, the first time period ($t_L$) can be the same as the second time period ($t_H$).

Figure 4B:
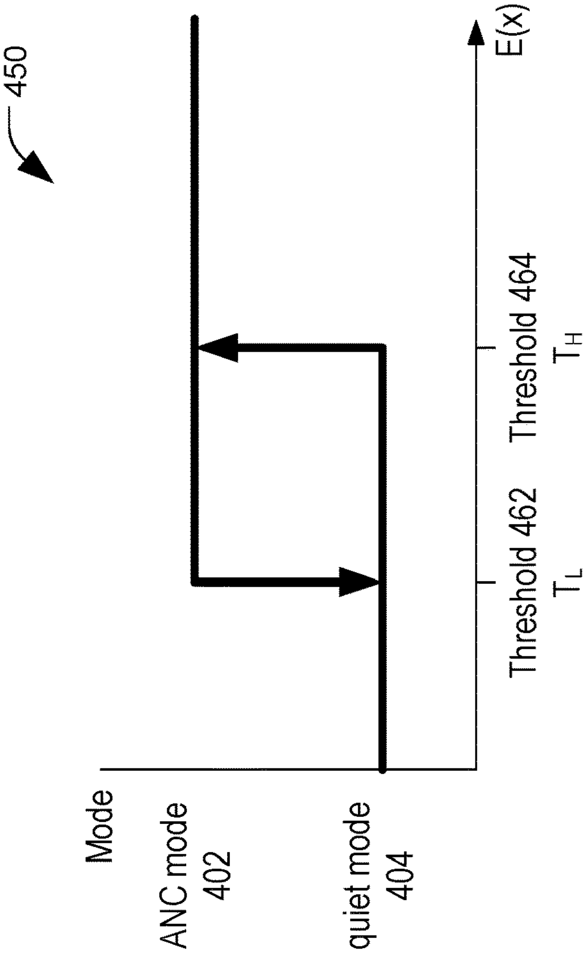
FIG. 4B is a diagram of an illustrative aspect of a transition control loop, in accordance with some examples of the present disclosure.

Referring to FIG. 4B, a transition control loop 450 is shown. In a particular aspect, the signal processing circuitry 102 is configured to transition between the ANC mode 402 and the quiet mode 404 following a hysteresis loop. In a particular example, the signal processing circuitry 102 transitions from the ANC mode 402 to the quiet mode 404 based on a threshold 462 corresponding to the threshold value $T_L$ and transitions from the quiet mode 404 to the ANC mode 402 based on a threshold 464 that corresponds to the threshold value $T_H$ In a particular aspect, the threshold value $T_L$ is lower than the threshold value $T_H$.

As noted above, hearables 100 worn at each ear of a user may be configured to communicate audio and/or control signals to each other wirelessly. For example, the True Wireless Stereo (TWS) protocol enables a stereo Bluetooth® stream to be provided to a master device (e.g., one of a pair of hearables 100), which reproduces one channel and transmits the other channel to a slave device (e.g., the other of the pair of hearables 100).

Even when a pair of hearables 100 is linked in such a fashion, many audio processing operations may occur independently on each device in the TWS group, such as ANC operation. A situation in which each device (e.g., hearable 100) enables or disables quiet mode independently of the device at the user's other ear can result in an unbalanced listening experience. For wireless hearables 100, a mechanism by which the two hearables 100 negotiate their states and share time information through a common reference clock can help ensure synchronized enactment of enabling and disabling quiet mode.

Figure 5A:
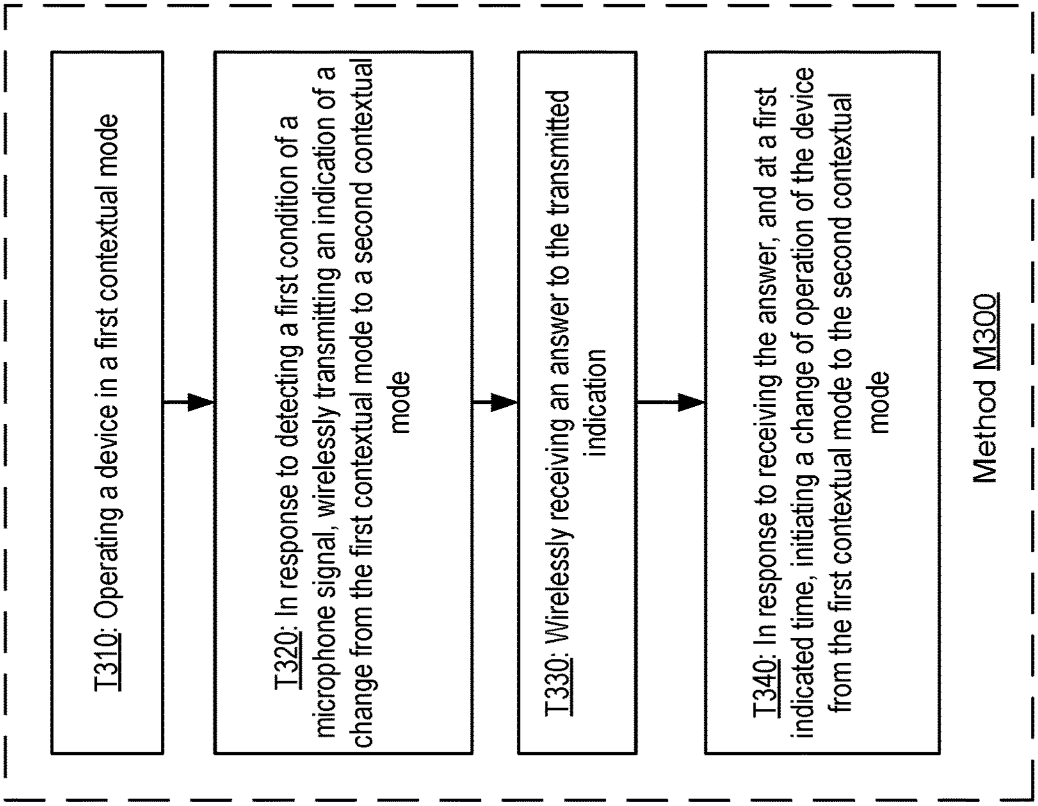
FIG. 5A is a flowchart of an illustrative aspect of a method of performing synchronized mode transitions, in accordance with some examples of the present disclosure.

Referring to FIG. 5A, a method M300 of performing synchronized mode transitions is shown. In a particular aspect, one or more operations of the method M300 are performed by the signal processing circuitry 102 of FIG. 1A.

The method M300 includes tasks T310, T320, T330, and T340. The task T310 includes operating a device in a first contextual mode (e.g., an ANC mode). For example, the signal processing circuitry 102 operates in a first contextual mode (e.g., the ANC mode 402 of FIG. 4).

The task T320 includes, in response to detecting a first condition of a microphone signal, wirelessly transmitting an indication of a change from the first contextual mode to a second contextual mode (e.g., a quiet mode). For example, the signal processing circuitry 102, in response to detecting a first condition (e.g., E(x)<$T_L$ for at least a first time period $t_L$), wirelessly transmits an indication of a change from the ANC mode 402 to the quiet mode 404. To illustrate, the signal processing circuitry 102 of the hearable D10L of FIG. 1B initiates transmission of a wireless signal WS10 indicating a change from the ANC mode 402 to the quiet mode 404.

The task T330 includes wirelessly receiving an answer to the transmitted indication. For example, the signal processing circuitry 102 receives an answer to the transmitted indication. To illustrate, the signal processing circuitry 102 of the hearable D10R of FIG. 1B, in response to receiving the wireless signal WS10 from the hearable D10L, initiates transmission of a wireless signal WS20 indicating an answer to the change indication received from the hearable D10L. The hearable D10L receives the wireless signal WS20 from the hearable D10R.

The task T340 includes, in response to receiving the answer, and at a first indicated time, initiating a change of operation of the device from the first contextual mode to the second contextual mode. For example, the signal processing circuitry 102, in response to receiving the answer, initiates a transition from the ANC mode 402 to the quiet mode 404. To illustrate, the signal processing circuitry 102 of the hearable D10L of FIG. 1B, in response to receiving the wireless signal WS20 indicating the answer, initiates a transition from the ANC mode 402 to the quiet mode 404.

In a particular implementation, a device (e.g., a hearable 100) includes a memory configured to store audio data and a processor (e.g., the signal processing circuitry 102) configured to receive the audio data from the memory and to control the device to perform the method M300. For example, the device (e.g., the hearable 100) can include a modem to which the processor (e.g., the signal processing circuitry 102) provides the indication of a change for wireless transmission. In a particular implementation, an apparatus includes means for performing each of the tasks T310, T320, T330, and T340 (e.g., as software executing on hardware). In a particular aspect, the means for performing each of the tasks T310, T320, T330, and T340 includes the signal processing circuitry 102, the hearable 100, the hearable D10R, the hearable D10L, a processor, one or more other circuits or components configured to perform each of the tasks T310, T320, T330, and T340, or any combination thereof. In a particular implementation, a non-transitory computer-readable storage medium includes code (e.g., instructions) which, when executed by at least one processor, causes the at least one processor to perform the method M300.

Figure 5B:
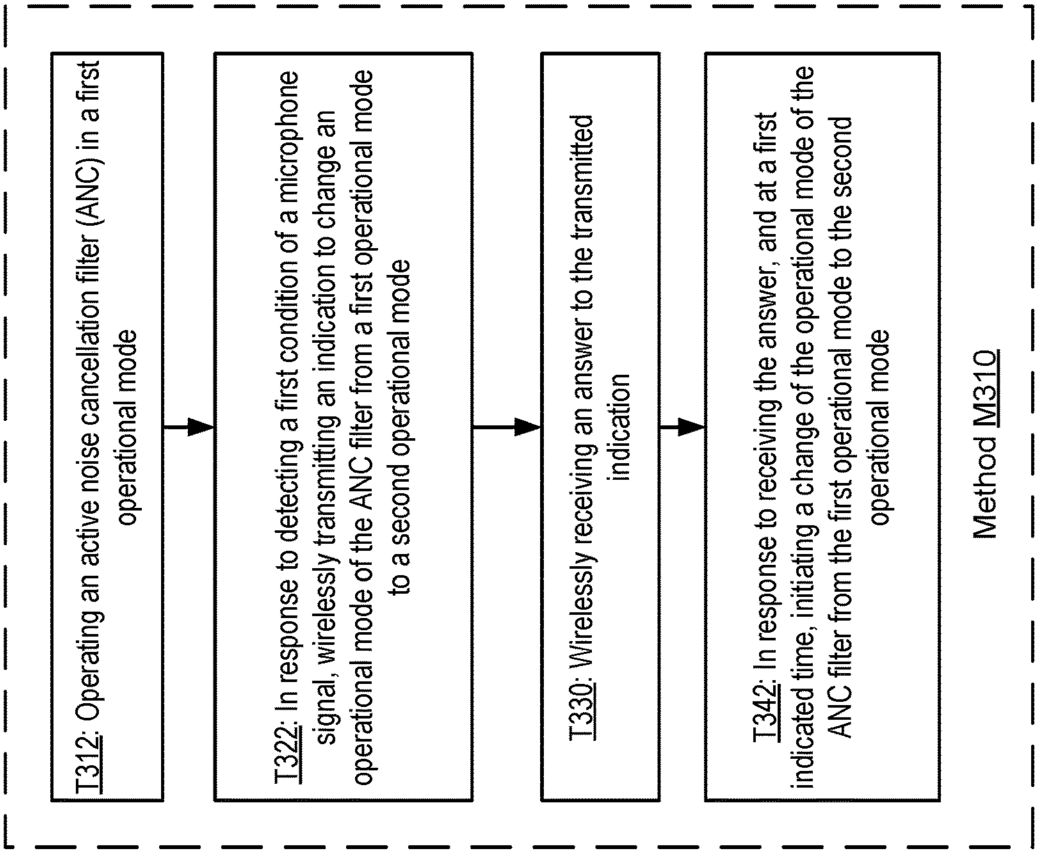
FIG. 5B is a flowchart of an illustrative aspect of a method of performing synchronized mode transitions, in accordance with some examples of the present disclosure.

Referring to FIG. 5B, a method M310 of performing synchronized mode transitions is shown. In a particular aspect, one or more operations of the method M310 are performed by the signal processing circuitry 102 of FIG. 1A. In a particular aspect, the method M310 corresponds to an implementation of the method M300. For example, the method M310 includes a task T312 as an implementation of the task T310, a task T322 as an implementation of the task 320, the task 330, and a task 342 as an implementation of the task 340. The task T312 includes operating an ANC filter in a first operational mode. The task 322 includes wirelessly transmitting, in response to detecting a first condition of a microphone signal, an indication to change an operational mode of the ANC filter from a first operational mode (e.g., in which output of the anti-noise signal from the loudspeaker is enabled) to a second operational mode (e.g., in which output of the anti-noise signal from the loudspeaker is reduced or disabled). The task T342 includes initiating, in response to receiving the answer, and at a first indicated time, a change of the operational mode of the ANC filter from the first operational mode to the second operational mode.

Figure 6B:
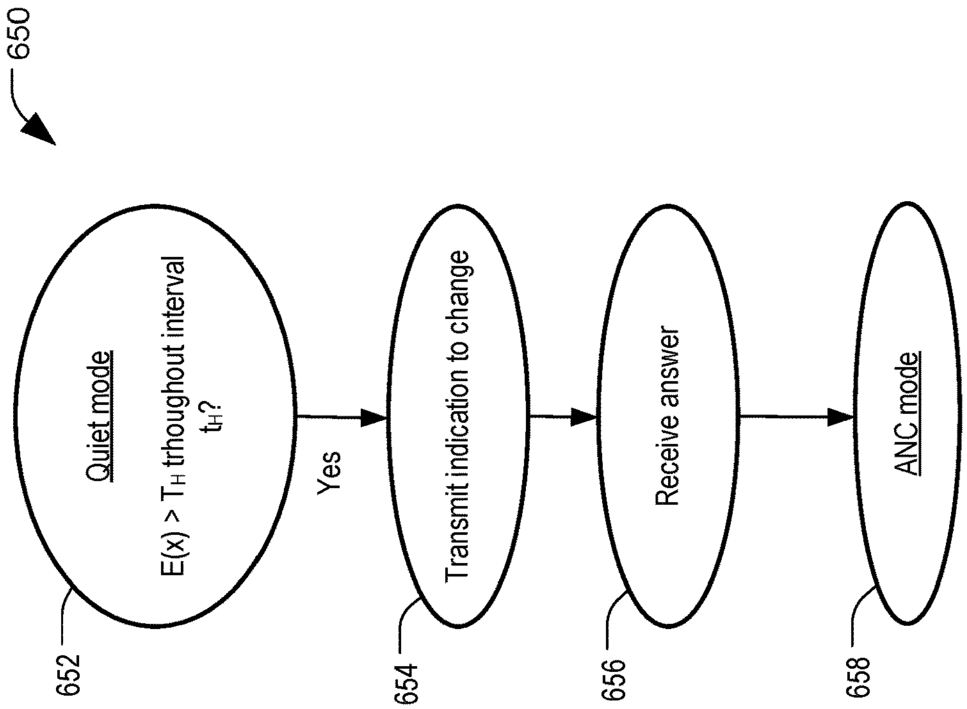
FIG. 6B is a flowchart of an illustrative aspect of a method of performing a synchronized mode transition from quiet mode to ANC mode, in accordance with some examples of the present disclosure.
Figure 6A:
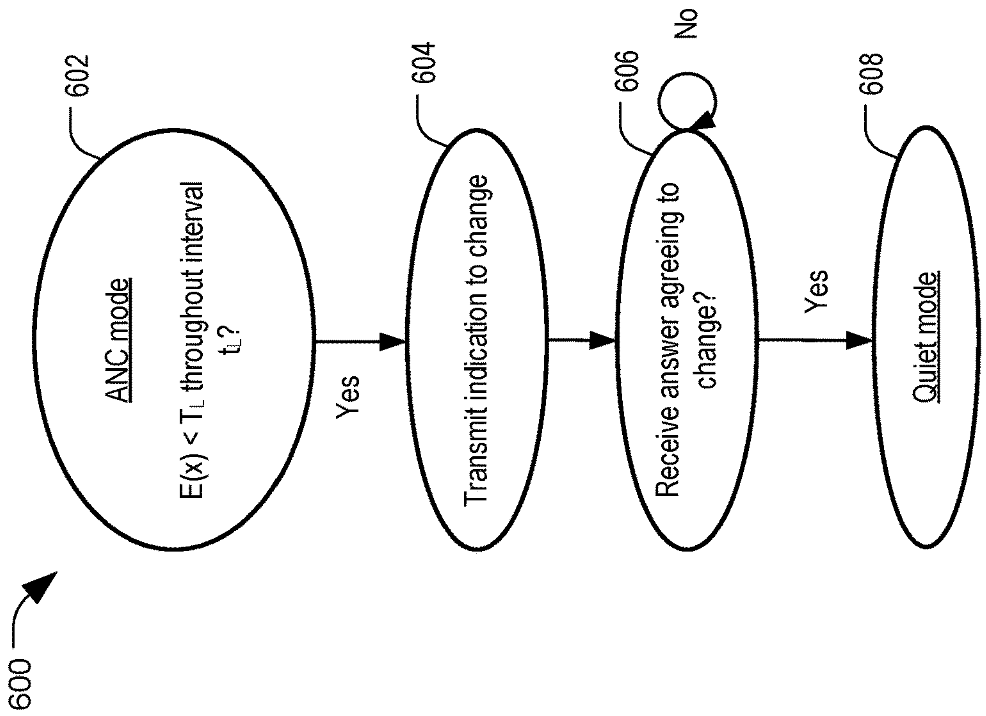
FIG. 6A is a flowchart of an illustrative aspect of a method of performing a synchronized mode transition from ANC mode to quiet mode, in accordance with some examples of the present disclosure.

Referring to FIG. 6A, a method 600 of performing a synchronized mode transition from the ANC mode 402 to the quiet mode 404 is shown. In a particular aspect, one or more operations of the method 600 are performed by the signal processing circuitry 102 of FIG. 1A.

The method 600 includes, at 602, determining whether a quiet change condition is detected. For example, the signal processing circuitry 102 of the hearable D10L of FIG. 1B determines whether the quiet change condition (e.g., $E(x)<T_L$ for at least a first time period ($t_L$)) is detected.

The method 600 also includes, upon detecting the quiet change condition, transmitting an indication to change to the other hearable, at 604. For example, the signal processing circuitry 102 of the hearable D10L of FIG. 1B, in response to detecting the quiet change condition (e.g., $E(x)<T_L$ for at least a first time period ($t_L$)), transmits a wireless signal WS10 to the hearable D10R, and the wireless signal WS10 includes an indication to change to the quiet mode 404.

The method 600 further includes, at 606, remaining in the ANC mode while waiting to receive an answer from the other hearable which indicates agreement. For example, the signal processing circuitry 102 of the hearable D10L remains in the ANC mode 402 while waiting to receive an answer from the hearable D10R which indicates agreement to the change to the quiet mode 404.

In a particular aspect, the method 600 includes, while waiting to receive the answer, at 606, checking whether the quiet change condition continues to be detected. For example, the signal processing circuitry 102 of the hearable D10L determines whether the quiet change condition (e.g., $E(x)<T_L$ for at least a first time period ($t_L$)) continues to be detected.

In a particular example, the method 600 includes, in response to determining that the quiet change condition is no longer detected, returning to 602. Alternatively, the method 600 includes, in response to receiving the answer indicating agreement to the change and determining that the quiet change condition continues to be detected, transitioning to the quiet mode, at 608. For example, the signal processing circuitry 102 of the hearable D10L, in response to receiving the answer from the hearable D10R indicating agreement to the change to the quiet mode 404 and determining that the quiet change condition (e.g., $E(x)<T_L$ for at least a first time period ($t_L$)) continues to be detected, transitions to the quiet mode 404 at a specified time (which may be indicated in the transmitted indication or in the received answer). In a particular aspect, the signal processing circuitry 102 of the hearable D10R also transitions to the quiet mode 404 at the specified time. Thus, the two devices (e.g., the hearables D10R, D10L) enter the quiet mode 404 synchronously.

In some examples, the method 600 includes selectively transitioning to the quiet mode. For example, the signal processing circuitry 102 of the hearable D10L, in response to receiving an answer from the hearable D10R indicating no agreement to the change to the quiet mode 404, refrains from transitioning to the quiet mode 404 and returns to 602. In some implementations, the signal processing circuitry 102 of the hearable D10L, in response receiving an answer from the hearable D10R indicating no agreement to the change to the quiet mode 404, performs a delay (e.g., enters an idle state) prior to returning to 602. As used herein, a "selective" transition to a contextual mode refers to transitioning to the contextual mode based on determining that a condition is satisfied. For example, the signal processing circuitry 102 of the hearable D10L selectively transitions to the quiet mode 404 in response to determining that a condition of receiving an answer from the hearable D10R indicating agreement to the change to the quiet mode 404 has been satisfied.

Referring to FIG. 6B, a method 650 of performing a synchronized mode transition from the quiet mode 404 to the ANC mode 402 is shown. In a particular aspect, one or more operations of the method 650 are performed by the signal processing circuitry 102 of FIG. 1A.

The method 650 includes, at 652, determining whether a noisy change condition is detected. For example, the signal processing circuitry 102 of the hearable D10L of FIG. 1B determines whether the noisy change condition (e.g., $E(x)>T_H$ for at least a second time period ($t_H$)) is detected.

The method 650 also includes, upon detecting the noisy change condition, transmitting an indication to change to the other hearable, at 654. For example, the signal processing circuitry 102 of the hearable D10L of FIG. 1B, in response to detecting the noisy change condition (e.g., $E(x)>T_H$ for at least a second time period ($t_H$)), transmits a wireless signal WS10 to the hearable D10R and the wireless signal WS10 includes an indication to change to the ANC mode 402.

The method 650 further includes, at 656, remaining in the quiet mode while waiting to receive an answer from the other hearable. In a particular aspect, the method 650 includes while waiting to receive the answer, at 656, checking whether the noisy change condition continues to be detected. For example, the signal processing circuitry 102 of the hearable D10L determines whether the noisy change condition (e.g., $E(x)>T_H$ for at least a second time period ($t_H$)) continues to be detected. In a particular example, the method 650 includes, in response to determining that the noisy change condition is no longer detected, returning to 652.

Alternatively, the method 650 includes, independently of receiving the answer and in response to determining that the noisy change condition continues to be detected, transitioning to the ANC mode, at 658. For example, the signal processing circuitry 102 of the hearable D10L, independently of receiving an answer from the hearable D10R indicating agreement to the change to the ANC mode 402 and in response to determining that the noisy change condition (e.g., $E(x)<Tx$ for at least a second time period ($t_H$)) continues to be detected, transitions to the ANC mode 402 at a specified time (which may be indicated in the transmitted indication or in the received answer). In a particular aspect, the signal processing circuitry 102 of the hearable D10R also transitions to the ANC mode 402 at the specified time. Thus, the two devices (e.g., the hearables D10R, D10L) enter the ANC mode 402 synchronously. As shown in FIGS. 6A and 6B, the two devices (e.g., the hearables D10R, D10L) may be configured to enter the quiet mode 404 only when both have detected the quiet change condition, and configured to leave the quiet mode 404 when either one has detected the noisy change condition.

Figure 7:
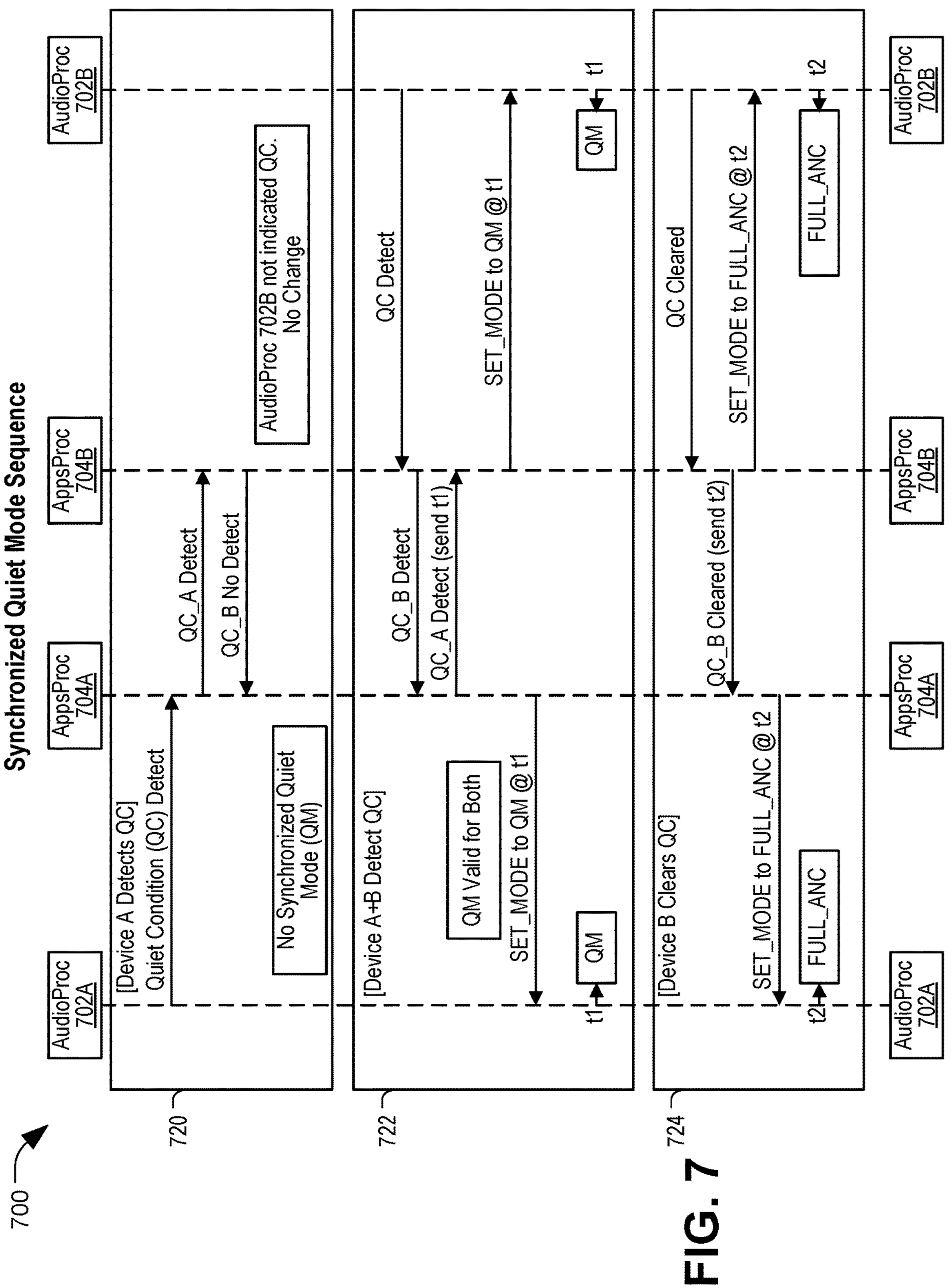
FIG. 7 is a diagram of an illustrative aspect of communication among audio processing and applications processing layers of a pair of devices configured to perform synchronized mode transitions, in accordance with some examples of the present disclosure.

Referring to FIG. 7, a diagram 700 of an illustrative aspect of communication among audio processing and applications processing layers of a pair of devices (e.g., hearables 100) is shown. In a particular aspect, the signal processing circuitry 102 of Device A includes an audio processing layer 702A, an applications processing layer 704A, or both, and the signal processing circuitry 102 of Device B includes an audio processing layer 702B, an applications processing layer 704B, or both.

Illustrated in a top panel 720, Device A (e.g., the hearable D10L of FIG. 1B) is operating in the ANC mode 402 (e.g., full ANC mode). Device A detects a quiet condition (QC) after 15 seconds (e.g., a first time period ($t_L$)) of low sound pressure level (e.g., $E(x)<T_L$) measured at the internal and external microphones. For example, the audio processing layer 702A detects the quiet condition (QC) and provides a notification (e.g. QC detect) to the applications processing layer 704A.

Device A (e.g., the hearable D10L) sends a change indication (e.g., QC_A detect) to Device B (e.g., the hearable D10R). QC_A detect indicates a change to the quiet mode 404. For example, the applications processing layer 704A, in response to receiving the QC detect from the audio processing layer 702A, initiates transmission of the QC_A detect to Device B (e.g., the hearable D10R).

Device B, in response to receiving the QC_A detect from Device A, determines whether the quiet condition (e.g., $E(x)<T_L$ for at least the first time period ($t_L$)) has been detected at Device B. In a particular implementation, the applications processing layer 704B determines that QC has not been detected at Device B in response to determining that a most recently received notification from the audio processing layer 702B does not correspond to a QC detect. In an alternative implementation, the applications processing layer 704B sends a status request to the audio processing layer 702B in response to receiving the QC_A detect and receives a notification from the audio processing layer 702B indicating whether the QC has detected at Device B.

Device B (e.g., the applications processing layer 704B), in response to determining that the QC has not been detected at Device B, initiates transmission of an answer (QC_B no detect) to Device A. In a particular aspect, QC_B no detect indicates no agreement at Device B to the change to the quiet mode 404. Device A, in response to receiving the answer (QC_B no detect) indicating no agreement to the change to the quiet mode 404, refrains from transitioning to the quiet mode 404 and remains in the ANC mode 402. The result is that neither Device A nor Device B transitions to the quiet mode 404.

Illustrated in a middle panel 722, Device B detects the QC subsequent to sending the QC_B no detect to Device A. For example, Device B detects the quiet condition after 15 seconds (e.g., the first time period (0) of low sound pressure level (e.g., $E(x)<T_L$) measured at the internal and external microphones. For example, the audio processing layer 702B detects the QC and provides a notification (QC detect) to the applications processing layer 704B.

Device B (e.g., the hearable D10R) sends a change indication (QC_B detect) to Device A (e.g., the hearable D10L). QC_B detect indicates a change to the quiet mode 404. For example, the applications processing layer 704B, in response to receiving the QC detect from the audio processing layer 702B, initiates transmission of the QC_B detect to Device A.

Device A (e.g., the hearable D10L), in response to receiving the QC_B detect from Device B (e.g., the hearable D10R), determines whether the QC has been detected at Device A. In a particular implementation, the applications processing layer 704A determines that QC has been detected at Device A in response to determining that a most recently received notification from the audio processing layer 702A corresponds to a QC detect. In an alternative implementation, the applications processing layer 704A sends a status request to the audio processing layer 702A in response to receiving the QC_B detect from Device B and determines that QC has been detected at Device A in response to receiving a QC detect from the audio processing layer 702A.

Device A (e.g., the applications processing layer 704A), in response to determining that the QC has been detected at Device A (e.g., the hearable D10L), initiates transmission of an answer (QC_A detect) to Device B (e.g., the hearable D10R). In a particular aspect, the answer indicates an agreement at Device A to transition to the quiet mode 404. In a particular implementation, the answer (QC_A detect (send t1)) includes a time indication of a first time (t1). In an alternative implementation, Device A (e.g., the hearable D10L) sends the time indication (t1) concurrently with sending the answer (QC_A detect) to Device B (e.g., the hearable D10R). In a particular aspect, the first time (t1) corresponds to a reference clock (e.g., a network clock). For example, the applications processing layer 704A generates the first time (t1) by adding a time difference (e.g., 30 seconds) to a current time (t0) of the reference clock (e.g., t1=t0+30 seconds).

In a particular aspect, the applications processing layer 704A schedules the change to the quiet mode 404 to occur at the first time (t1). For example, the applications processing layer 704A determines a first local time of a local clock of Device A that corresponds to the first time (t1) of the reference clock. The applications processing layer 704A sends a request (SET_MODE to quiet mode (QM) @ t1) to the audio processing layer 702A to transition to the quiet mode 404 at the first local time (e.g., the first time (t1) of the reference clock).

Device B receives the answer (QC_A detect) and the time indication of the first time (t1). Device B (e.g., the applications processing layer 704B), in response to receiving the answer (QC_A detect) indicating agreement to the change to the quiet mode 404, schedules the change to the quiet mode 404 to occur at the first time (t1) indicated in the time indication. For example, the applications processing layer 704B determines a second local time of a local clock of Device B that corresponds to the first time (t1) of the reference clock. The applications processing layer 704B sends a request (SET_MODE to quiet mode (QM) @ t1) to the audio processing layer 702B to transition to the quiet mode 404 at the second local time (e.g., the first time (t1) of the reference clock).

The audio processing layer 702A transitions to the quiet mode 404 at the first local time of the local clock of Device A (e.g., the first time (t1) of the reference clock). The audio processing layer 702B transitions to the quiet mode 404 at the second local time of the local clock of Device B (e.g., the first time (t1) of the reference clock). Thus, Device A and B both transition to the quiet mode 404 at the time t1 of the reference clock synchronously.

Illustrated in a bottom panel 724, Device B (e.g., the hearable D10R) detects a noisy change condition after 5 seconds (e.g., second time period ($t_H$)) of environmental noise greater than device self-noise levels (e.g., E(x)>Tx). For example, the audio processing layer 702B detects the noisy change condition and provides a notification (e.g. QC cleared) to the applications processing layer 704B.

Device B (e.g., the hearable D10R), in response to detecting the noisy change condition, sends a change indication (QC_B cleared), a time indication of a second time (tr), or both, to Device A (e.g., the hearable D10L). The change indication indicates a change from the quiet mode 404 to the ANC mode 402. In a particular implementation, the change indication (QC_B cleared (send t2)) includes the time indication of the second time (t2). In an alternative implementation, Device B (e.g., the hearable D10R) sends the time indication (t2) concurrently with sending the change indication (QC_B cleared) to Device A (e.g., the hearable D10L). In a particular aspect, the second time (t2) corresponds to the reference clock (e.g., the network clock).

In a particular aspect, the applications processing layer 704B schedules the change to the ANC mode 402 to occur at the second time (t2). For example, the applications processing layer 704B determines a particular local time of the local clock of Device B that corresponds to the second time (t2) of the reference clock. The applications processing layer 704B sends a request (SET_MODE to full ANC (FULL_ANC) @ t2) to the audio processing layer 702B to transition to the ANC mode 402 at the particular local time (e.g., the second time (t2) of the reference clock).

Device A receives the change indication (QC_B cleared) and the time indication of the second time (t2). Device A (e.g., the applications processing layer 704A), in response to receiving the change indication (QC_B cleared) indicating the change to the ANC mode 402, schedules the change to the ANC mode 402 to occur at the second time (t2) indicated by the time indication. For example, the applications processing layer 704A determines a particular local time of a local clock of Device A that corresponds to the second time (t2) of the reference clock. The applications processing layer 704A sends a request (SET_MODE to FULL_ANC @ t2) to the audio processing layer 702A to transition to the ANC mode 402 at the particular local time (e.g., the first time (t1) of the reference clock).

The audio processing layer 702A transitions to the ANC mode 402 at the particular local time of the local clock of Device A (e.g., the second time (t2) of the reference clock). The audio processing layer 702B transitions to the ANC mode 402 at the particular local time of the local clock of Device B (e.g., the second time (t2) of the reference clock). Thus, Device A and B both transition out of the quiet mode 404 at the time t2 of the reference clock synchronously.

In a particular aspect, Device A transitions to the ANC mode 402 independently of checking whether the noisy change condition is detected at Device A and Device B transitions to the ANC mode 402 independently of receiving an answer to the change indication indicating the change to the ANC mode 402. Devices A and B thus transition to the ANC mode 402 when the noisy change condition is detected at either Device A or Device B. However, Devices A and B transition to the quiet mode 404 when the quiet condition is detected at both Devices A and B.

Although the example illustrated in FIG. 7 includes Device A transitioning from the ANC mode 402 to the quiet mode 404 at the time t1 and transitioning from the quiet mode 404 to the ANC mode 402, in other examples Device A may transition in one direction (e.g., from the ANC mode 402 to the quiet mode 404) without necessarily transitioning back (e.g., from the quiet mode 404 to the ANC mode 402) at a later time. Other examples described herein include a first transition from a first contextual mode to a second contextual mode at a first time and a second transition from the second contextual mode to the first contextual mode. In some implementations, one of the first transition or the second transition can be performed without requiring the other of the first transition or the second transition to also be performed.

In a particular implementation, the signal processing circuitry 102 is configured to adapt a gain of an ANC operation to compensate for variations in fit of the hearable 100 relative to the user's ear canal, as fit may vary from one user to another and may also vary for the same user over time. In a particular implementation, the signal processing circuitry 102 is configured, for example, to add a control that enables the overall noise reduction to be adjusted. Such a control may be implemented by subtracting a scaled version of the reference signal x (e.g., a scaled version of the estimated reference signal x') from the error signal e to produce a modified error signal e' that replaces error signal e in the ANC operation.

In one such example, the signal processing circuitry 102 is configured to subtract a copy of the estimated signal x' that is scaled by a factor a from an error signal e to produce a modified error signal e': e'=e−a*x'. In this example, a value of a=0 corresponds to full noise cancellation (e'=e), and a value of a=1 corresponds to no noise cancellation (e'=e−x'), such that the signal processing circuitry 102 can control overall noise cancellation by adjusting the factor a (e.g., according to whether the ANC mode 402 or the quiet mode 404 is selected). In some implementations, the signal processing circuitry 102 is configured to, based on a comparison of the E(x) and one or more thresholds, select a value of the factor a between 0 and 1 to enable partial noise cancellation. A value of the factor a closer to 0 corresponds to more noise cancellation, whereas a value of the factor a closer to 1 corresponds to less noise cancellation. In a particular aspect, the signal processing circuitry 102 is configured to adjust a gain of an ANC filter based on the value of the factor a.

The principle of a shared audio processing context across earbuds can be extended to exchanges of processing information among wireless earbuds or personal audio devices (currently, only user interface (UI) information is exchanged) to support other use cases. In one such case, disabling of ANC operation in response to wind noise is coordinated among multiple devices (e.g., the hearables 100).

In a particular aspect, the signal processing circuitry 102 is configured to disable ANC operation (or at least, to disable the feedforward ANC path) when wind noise is experienced, as the signal from an external microphone affected by wind noise is likely to be unusable for ANC. In one example, one hearable (e.g., the hearable D10R) experiences wind noise and the other hearable (e.g., the hearable D10L) doesn't (for example, while the user is sitting in a window seat on a bus or train). In this example, the noise cancellation applied to both hearables D10L, D10R (e.g., earbuds) is matched to provide a uniform listening experience.

Figure 8:
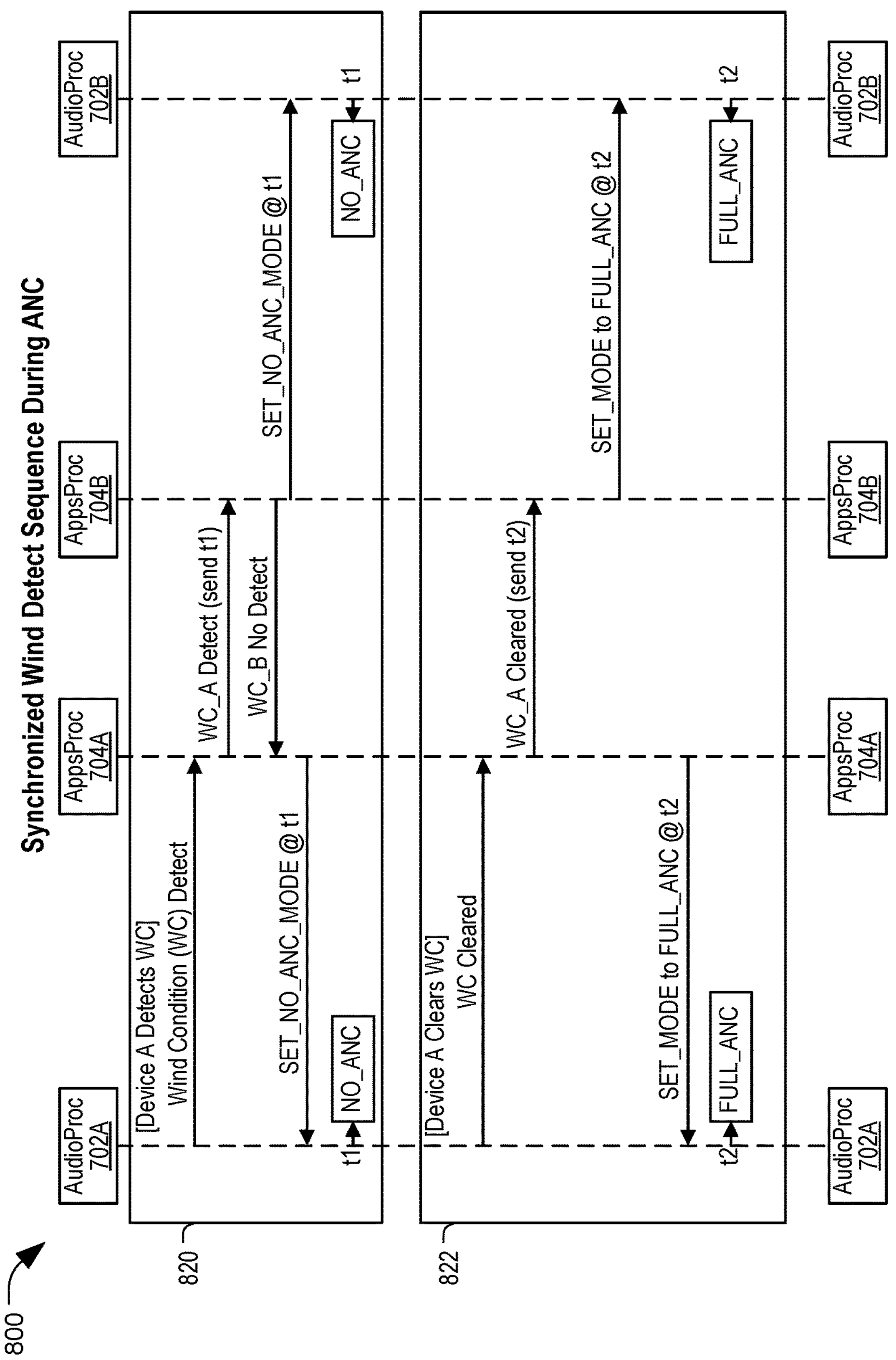
FIG. 8 is a diagram of another illustrative aspect of communication among audio processing and applications processing layers of a pair of devices configured to perform synchronized mode transitions, in accordance with some examples of the present disclosure.

Referring to FIG. 8, a diagram 800 of an illustrative aspect of communication among audio processing and applications processing layers of a pair of such devices (e.g., hearables 100) is shown. Illustrated in a top panel 820, Device A (e.g., the hearable D10L, such as a left earbud) which faces a window detects severe wind noise (e.g., detects that a level of low-frequency noise in the microphone signal exceeds a second threshold value). For example, the audio processing layer 702A detects a noisy change condition (e.g., E(x)>Tx) and sends a wind condition (WC) notification (WC detect) to the applications processing layer 704A. The applications processing layer 704A, in response to receiving the WC detect, initiates transmission of a change indication (WC_A detect) to Device B. The change indication indicates a change to an ANC disabled mode. In a particular aspect, the change indication includes or is sent concurrently with a time indication of a first time (t1).

Device B (e.g., the hearable D10R, such as a right earbud) which faces a cabin receives the change indication (WC_A detect) from Device A (e.g., the hearable D10L, such as the left earbud) facing the window. The applications processing layer 704B of Device B, in response to receiving the change indication (WC_A detect) and the time indication of the first time (t1), schedules a change to the ANC disabled mode to occur at the first time by sending a request (SET_NO_ANC_MODE @ t1) to the audio processing layer 702B. The request indicates a first local time of Device B that corresponds to the first time of a reference clock.

In some implementations, the applications processing layer 704B, in response to receiving the change indication (WC_A detect) from Device A and determining that the noisy change condition is not detected at Device B, sends an answer (WC_B no detect) to Device A. The applications processing layer 704A, independently of receiving the answer from Device B, schedules a change to the ANC disabled mode to occur at the first time by sending a request (SET_NO_ANC_MODE @ t1) to the audio processing layer 702A. The request indicates a second local time of Device A that corresponds to the first time (t1) of the reference clock.

The audio processing layer 702B transitions to the ANC disabled mode (No_ANC mode) at the first local time of Device B (e.g., the first time (t1) of the reference clock). The audio processing layer 702A transitions to the ANC disabled mode (No_ANC mode) at the second local time of Device A (e.g., the first time (t1) of the reference clock). Device B (e.g., the right earbud) thus performs the synchronized transition to the ANC disabled mode at the same time as Device A (e.g., the left earbud) to maintain a uniform listening experience on both Devices A and B.

Illustrated in a bottom panel 822, Device A determines that the noisy change condition is no longer detected at Device A. For example, the audio processing layer 702A in response to determining that the noisy change condition (e.g., E(x)>Tx) is no longer detected, sends a wind condition cleared notification (WC cleared) to the applications processing layer 704A. The applications processing layer 704A, in response to receiving the WC cleared, initiates transmission of a change indication (WC_A cleared) to Device B. The change indication indicates a change to an ANC enabled mode (FULL_ANC). In a particular aspect, the change indication includes or is sent concurrently with a time indication of a second time (t2).

The applications processing layer 704B of Device B, in response to receiving the change indication (WC_A cleared) and the time indication of the second time (t2), schedules a change to the ANC enabled mode to occur at the second time by sending a request (SET_MODE to FULL_ANC @ t2) to the audio processing layer 702B. The request indicates a first local time of Device B that corresponds to the second time (t2) of the reference clock.

The applications processing layer 704A, independently of receiving an answer to the change indication (WC_A cleared) from Device B, schedules a change to the ANC enabled mode to occur at the second time by sending a request (SET_MODE to FULL_ANC @ t2) to the audio processing layer 702A. The request indicates a second local time of Device A that corresponds to the second time (t2) of the reference clock.

The audio processing layer 702B transitions to the ANC enabled mode (FULL_ANC mode) at the first local time of Device B (e.g., the second time (t2) of the reference clock). The audio processing layer 702A transitions to the ANC enabled mode (FULL_ANC mode) at the second local time of Device A (e.g., the second time (t2) of the reference clock). Device B (e.g., the right earbud) thus performs the synchronized transition to the ANC enabled mode at the same time as Device A (e.g., the left earbud) after the wind noise is longer detected at Device A.

Figure 9:
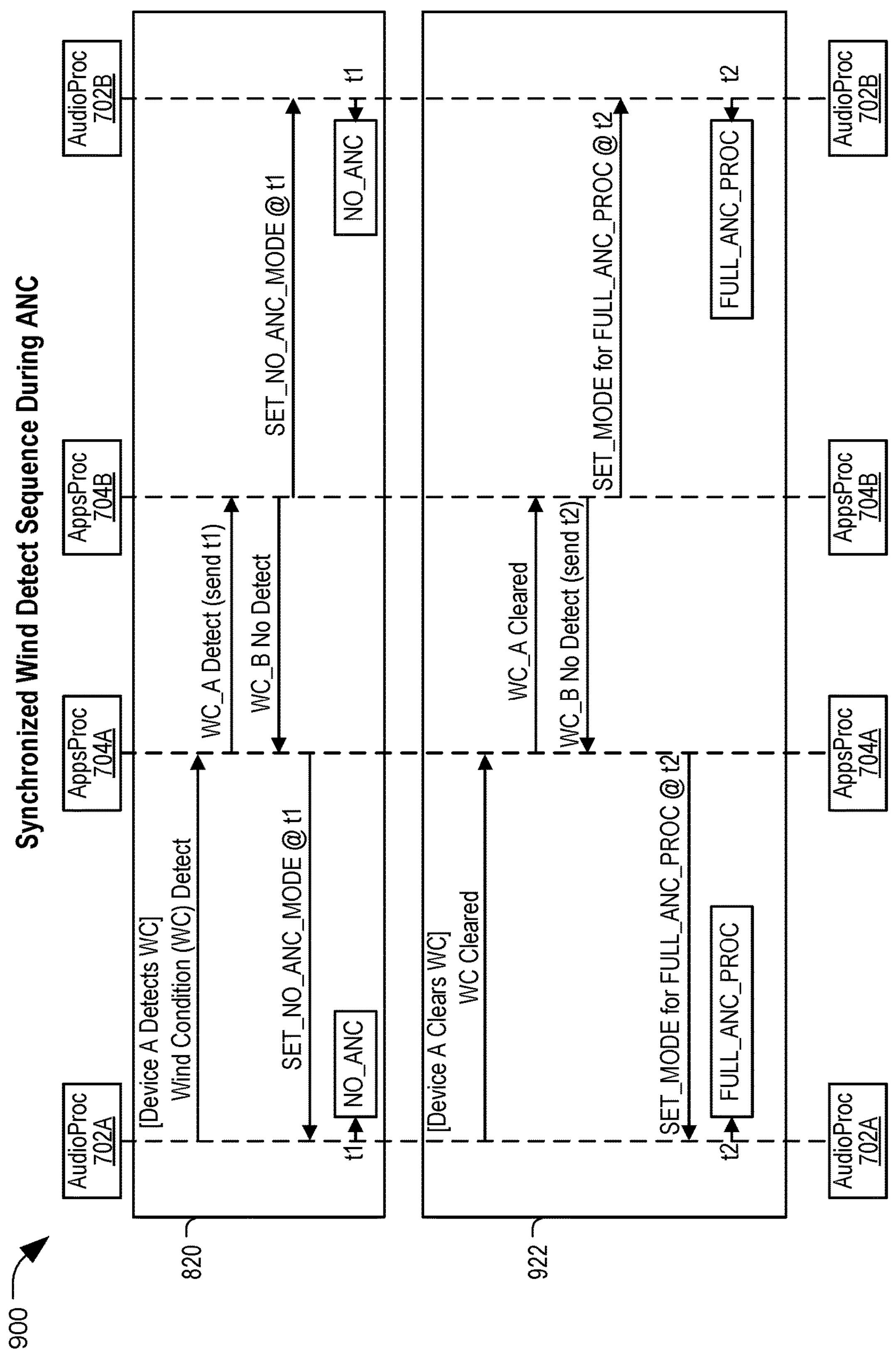
FIG. 9 is a diagram of another illustrative aspect of communication among audio processing and applications processing layers of a pair of devices configured to perform synchronized mode transitions, in accordance with some examples of the present disclosure.

Referring to FIG. 9, a diagram 900 of an illustrative aspect of communication among audio processing and applications processing layers of a pair of devices (e.g., hearables 100) is shown. Illustrated in a bottom panel 922, Device B, in response to receiving the change indication (WC_A cleared) from Device A and determining that the noisy change condition is not detected at Device B, initiates transmission of an answer (WC_B no detect) to Device B. The answer indicates agreement at Device B to the change to the ANC enabled mode. In a particular aspect, the answer includes or is sent concurrently with a time indication of the second time (t2) of a reference clock.

The applications processing layer 704A, in response to receiving the answer (WC_B no detect) from Device B indicating agreement at Device B to the change to the ANC enabled mode, schedules a change to the ANC enabled mode to occur at the second time by sending a request (SET_MODE to FULL_ANC @ t2) to the audio processing layer 702A.

In some other examples, if Device B determines that the noisy change condition is detected at Device B, Device B initiates transition of the answer indicating no agreement at Device B to the change to the ANC enabled mode. In these examples, Device A would remain in the ANC disabled mode in response to receiving the answer indicating no agreement to change to the ANC enabled mode. Device A and B thus transition to the ANC disabled mode after the noisy change condition is not detected at both Devices A and B.

Figure 10B:
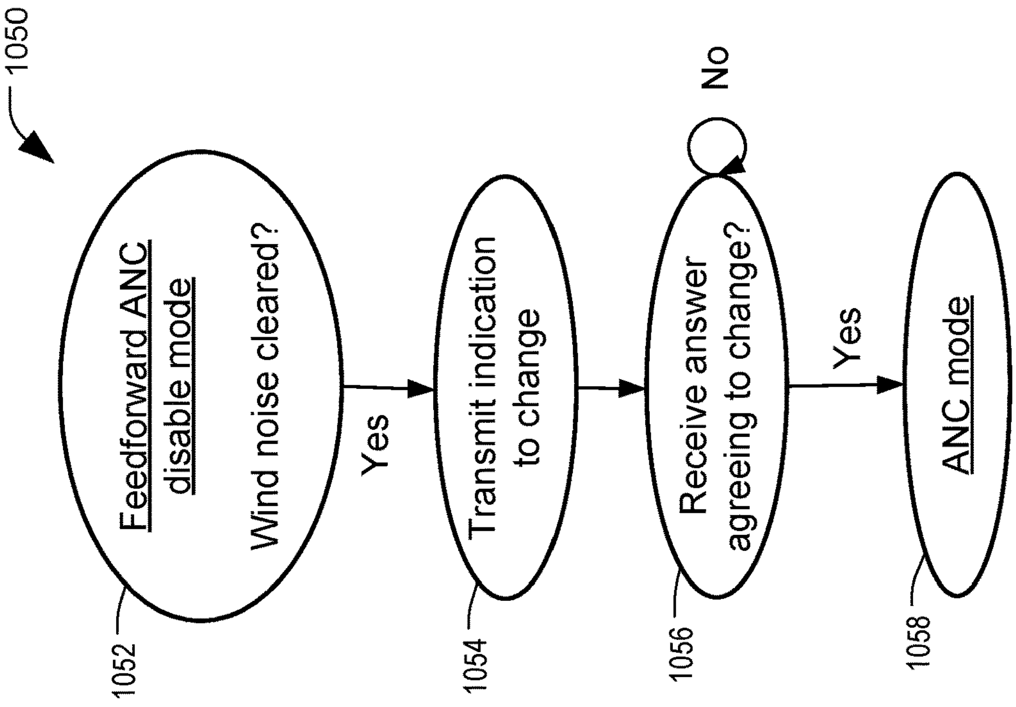
FIG. 10B is a diagram of an illustrative aspect of a method of performing a synchronized mode transition from feed-forward ANC disable mode to ANC mode, in accordance with some examples of the present disclosure.
Figure 10A:
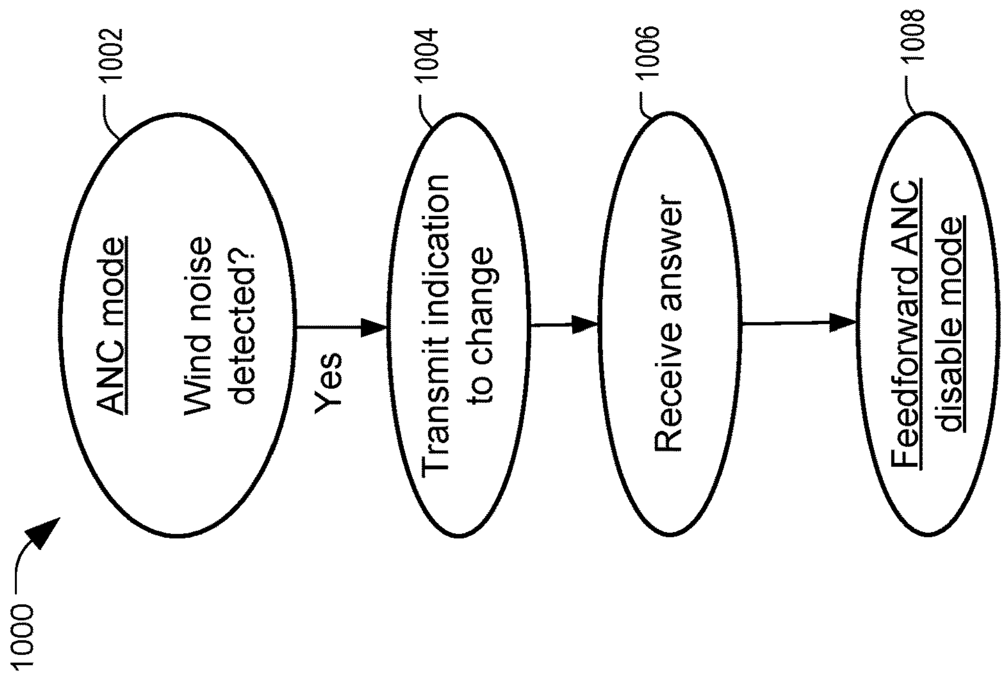
FIG. 10A is a diagram of an illustrative aspect of a method of performing a synchronized mode transition from ANC mode to feedforward ANC disable mode, in accordance with some examples of the present disclosure.

Referring to FIG. 10A, a method 1000 of performing a synchronized mode transition from an ANC enabled mode to an ANC disabled mode (e.g., a feedforward ANC disable mode) is shown. In a particular aspect, one or more operations of the method 1000 are performed by the signal processing circuitry 102 of FIG. 1A.

The method 1000 includes, at 1002, determining whether wind noise (e.g., a noisy change condition) is detected. For example, the signal processing circuitry 102 of the hearable D10L of FIG. 1B determines whether the wind noise (e.g., E(x)>Tx for at least a time period ($t_H$)) is detected.

The method 1000 includes, in response to determining that wind noise (e.g., the noisy change condition) is detected, transmitting a change indication of a change to the ANC disabled mode (e.g., the feedforward ANC disable mode), at 1004. For example, the signal processing circuitry 102 of the hearable D10L, in response to determining that wind noise is detected, initiates transmission of a change indication (WC_A detect) to Device B, as described with reference to FIG. 8.

The method 1000 includes receiving an answer, at 1006. For example, the signal processing circuitry 102 of the hearable D10L receives an answer (WC_B no detect) indicating that the wind noise is not detected at Device B, as described with reference to FIG. 8. In some other examples, the answer can indicate that wind noise is detected at Device B.

The method 1000 includes transitioning to the ANC disabled mode (e.g., the feedforward ANC disable mode), at 1008. For example, the signal processing circuitry 102 of the hearable D10L schedules the change to the ANC disabled mode independently of the answer from Device B, as described with reference to FIG. 8.

Referring to FIG. 10B, a method 1050 of performing a synchronized mode transition from an ANC disabled mode (e.g., a feedforward ANC disable mode) to an ANC enabled mode is shown. In a particular aspect, one or more operations of the method 1050 are performed by the signal processing circuitry 102 of FIG. 1A.

The method 1050 includes, at 1052, determining whether wind noise has cleared (e.g., a quiet condition is detected). For example, the signal processing circuitry 102 of the hearable D10L of FIG. 1B determines whether the wind noise has cleared (e.g., $E(x)<T_L$ for at least a time period $t_L$).

The method 1050 includes, in response to determining that wind noise is cleared (e.g., the quiet condition is detected), transmitting a change indication of a change to the ANC enabled mode, at 1054. For example, the signal processing circuitry 102 of the hearable D10L, in response to determining that wind noise is cleared, initiates transmission of a change indication (WC_A cleared) to Device B, as described with reference to FIGS. 8-9.

The method 1050 includes, at 1056, remaining in the ANC disabled mode while waiting to receive an answer indicating an agreement to the change. For example, the signal processing circuitry 102 of the hearable D10L remains in the ANC enabled mode while waiting to receive an answer from the hearable D10R which indicates agreement to the change to the ANC enabled mode, as described with reference to FIG. 8.

The method 1050 includes, in response to receiving an answer indicating an agreement to the change, transitioning to the ANC enabled mode, at 1058. For example, the signal processing circuitry 102 of the hearable D10L, in response to receiving an answer (e.g., WC_B no detect) indicating an agreement at Device B to the change to the ANC enabled mode, schedules the change to the ANC enabled mode, as described with reference to FIG. 8.

In some aspects, the methods M100, M200, and M300 as described above (and the corresponding devices, media, and apparatus) may be implemented (e.g., for a wind noise use case) such that the two contextual modes are, for example, music playback with cancellation of ambient noise (e.g., sounds of a vehicle in which the user is a passenger) and music playback without ambient noise cancellation. In some aspects, the method M310 as described above (and the corresponding devices, media, and apparatus) may be implemented (e.g., for a wind noise use case) such that the two operational modes are ANC mode and NO_ANC mode (or feedforward ANC disable mode). It is noted that the wind detection scenario described herein with reference to FIGS. 8, 9, 10A, and 10B may also be applied to other sudden pressure changes that may cause microphone clipping, such as slamming of a car door.

In a particular aspect, the signal processing circuitry 102 is configured, in a case of synchronized operation in response to a sensed event (e.g., quiet mode and wind detect mode, as described herein), to implement one or more hysteresis settings and/or hold timers, which may enable for the frequency of synchronized events to be controlled. For transitions to and from an operational mode that is triggered by high values of a parameter X, for example, a hysteresis setting may be implemented by setting a first threshold on the value of the parameter X to enter the mode and a second threshold on the value of the parameter X to leave the mode, where the first threshold is higher than the second threshold. Such a hysteresis setting may improve the user experience by ensuring that short transients around a threshold value do not cause an undesirable cycling of the device (e.g., the hearable 100) back and forth between two operational modes over a short period of time (e.g., an undesirable rapid and repeated "on/off" behavior). A hold timer (e.g., an interval of time over which a mode change condition must persist before a mode change is triggered) may ensure that longer transients do not interrupt the intended behavior. Transition controls such as hysteresis settings and/or hold timers may also ensure that the network is not overloaded with synchronization activity.

Figure 11:
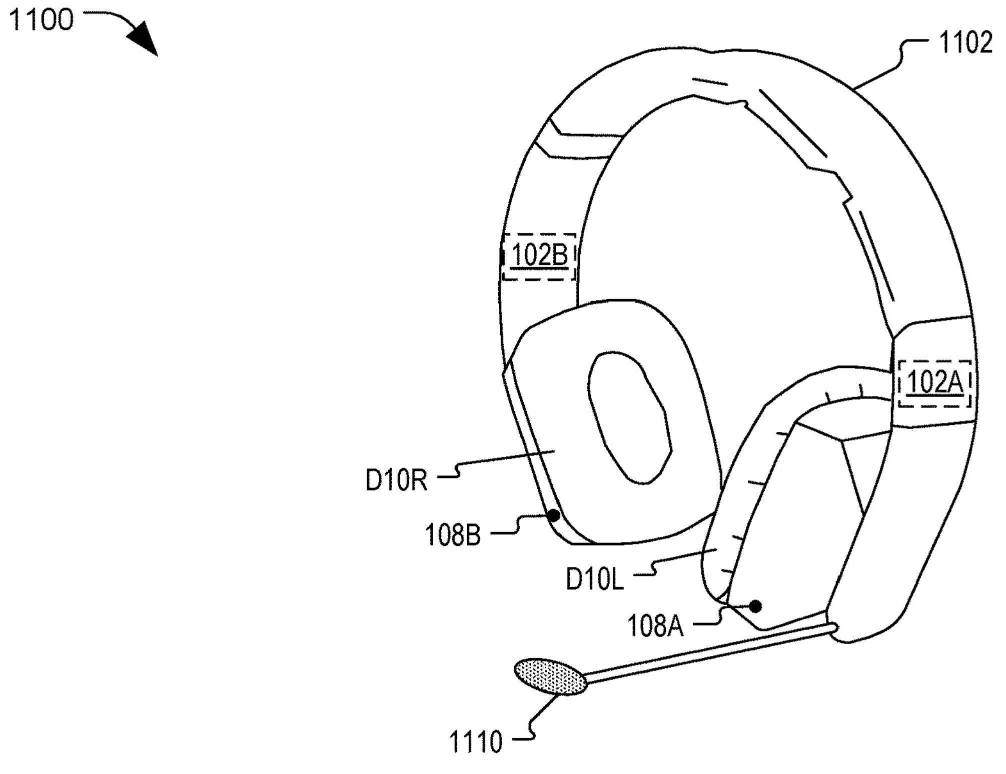
FIG. 11 is a diagram of a headset operable to perform synchronized mode transitions, in accordance with some examples of the present disclosure.

FIG. 11 depicts an implementation 1100 in which a headset device 1102 includes a plurality of hearables, e.g., the hearable D10L and the hearable D10R. The hearable D10L includes signal processing circuitry 102A coupled to a microphone 108A. The hearable D10R includes signal processing circuitry 102B coupled to a microphone 108B. In a particular aspect, the headset device 1102 includes one or more additional microphones, such as a microphone 1110. For example, the microphone 1110 is configured to capture user speech of a user wearing the headset device 1102, the microphone 108A is configured to capture ambient sounds for the hearable D10L, and the microphone 108B is configured to capture ambient sounds for the hearable D10R.

In a particular aspect, the signal processing circuitry 102A is configured to detect a change condition (e.g., a noisy change condition or a quiet condition) based on a microphone signal received from the microphone 108A and to initiate a synchronized mode transition by sending a change indication to the hearable D10R based on the detected change condition. Similarly, the signal processing circuitry 102B is configured to detect a change condition (e.g., a noisy change condition or a quiet condition) based on a microphone signal received from the microphone 108B and to initiate a synchronized mode transition by sending a change indication to the hearable D10L based on the detected change condition.

Figure 12:
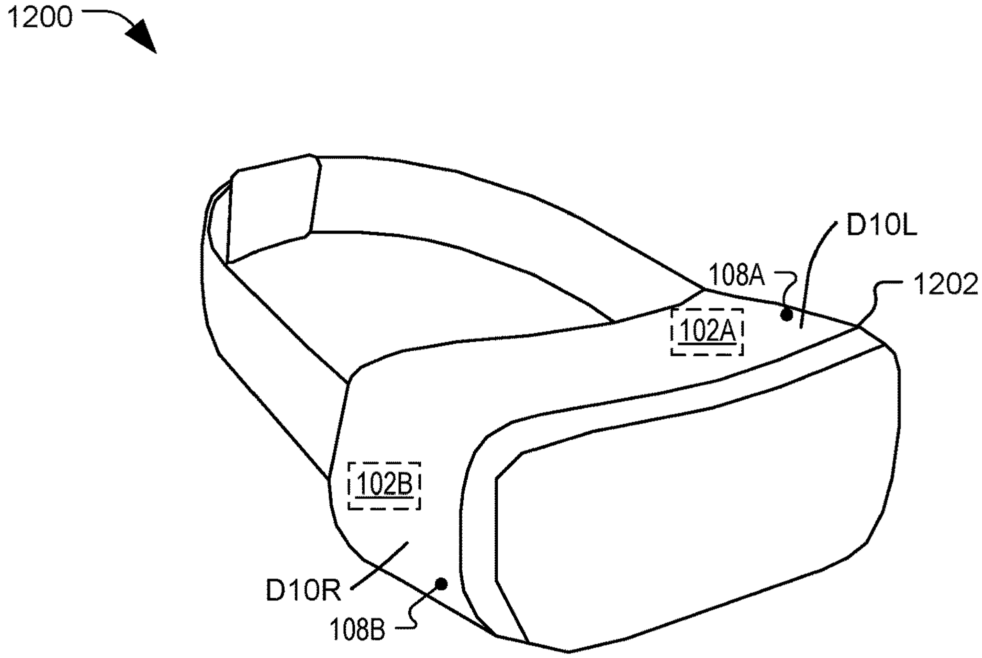
FIG. 12 is a diagram of a headset, such as a virtual reality, mixed reality, or augmented reality headset, operable to perform synchronized mode transitions, in accordance with some examples of the present disclosure.

FIG. 12 depicts an implementation 1200 of a portable electronic device that corresponds to a virtual reality, mixed reality, or augmented reality headset 1202. The headset 1202 includes a plurality of hearables, e.g., the hearable D10L and the hearable D10R. The hearable D10L includes the signal processing circuitry 102A coupled to the microphone 108A. The hearable D10R includes the signal processing circuitry 102B coupled to the microphone 108B.

In a particular aspect, the signal processing circuitry 102A is configured to detect a change condition (e.g., a noisy change condition or a quiet condition) based on a microphone signal received from the microphone 108A and to initiate a synchronized mode transition by sending a change indication to the hearable D10R based on the detected change condition. Similarly, the signal processing circuitry 102B is configured to detect a change condition (e.g., a noisy change condition or a quiet condition) based on a microphone signal received from the microphone 108B and to initiate a synchronized mode transition by sending a change indication to the hearable D10L based on the detected change condition.

A visual interface device is positioned in front of the user's eyes to enable display of augmented reality, mixed reality, or virtual reality images or scenes to the user while the headset 1202 is worn. In a particular example, the visual interface device is configured to display a notification indicating a transition to a contextual mode (e.g., quiet mode, ANC mode, full ANC mode, partial ANC mode, or a transparency mode). In a particular aspect, the "transparency mode" refers to a "pass-through" mode in which ambient noise is passed through. In some examples, far-end audio and media streaming and playback are suspended in the transparency mode. In other examples, far-end audio and media streaming and playback are not suspended in the transparency mode.

Figure 13:
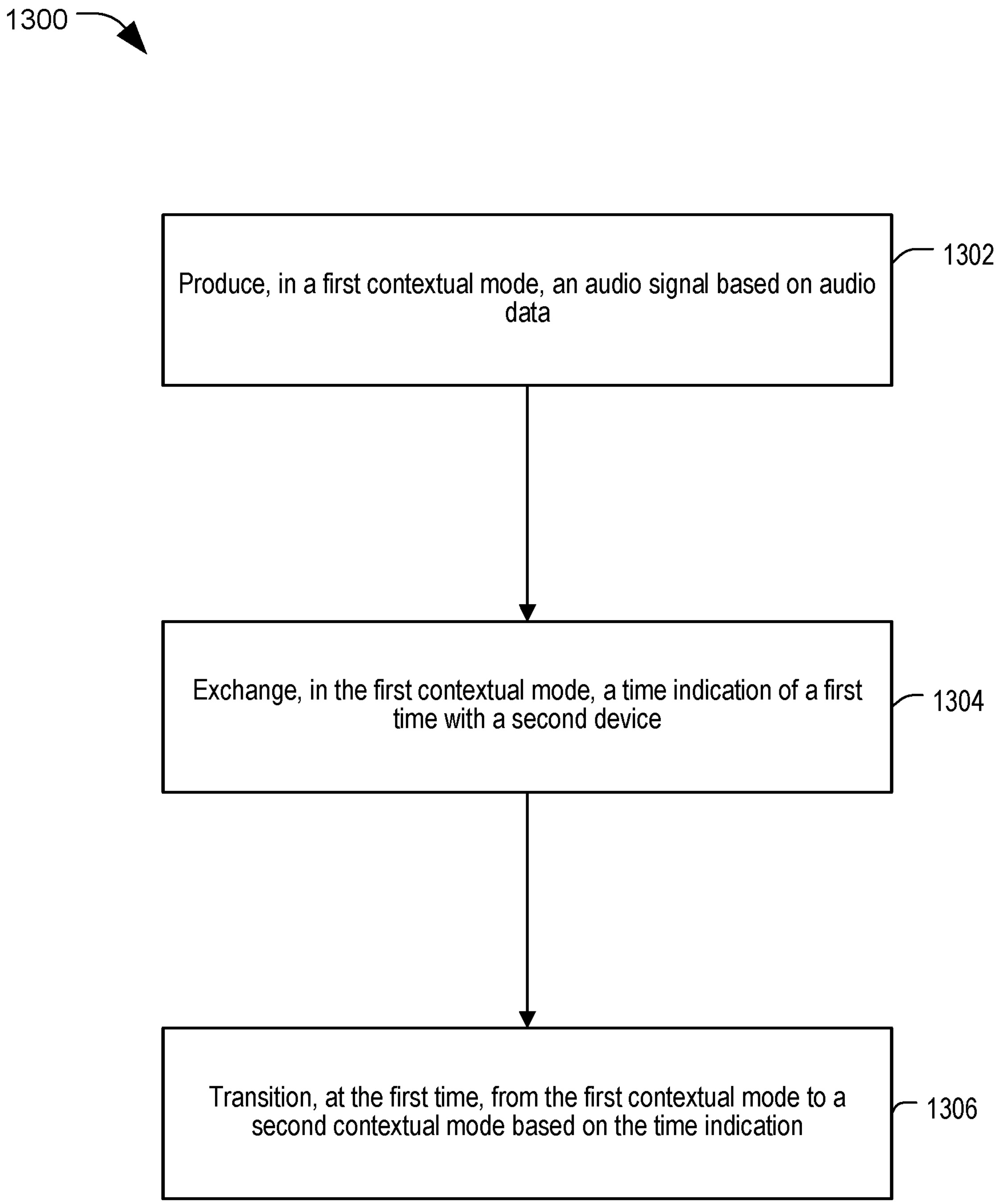
FIG. 13 is diagram of a particular implementation of a method of performing synchronized mode transitions that may be performed by the hearable of FIG. 1A, in accordance with some examples of the present disclosure.

Referring to FIG. 13, a particular implementation of a method 1300 of performing synchronized mode transition is shown. In a particular aspect, one or more operations of the method 1300 are performed by at least one of the signal processing circuitry 102, the hearable 100 of FIG. 1A, the hearable D10R, the hearable D10L of FIG. 1B, the signal processing circuitry 102A, the signal processing circuitry 102B of FIG. 11 or FIG. 12, or a combination thereof.

The method 1300 includes producing, in a first contextual mode, an audio signal based on audio data, at 1302. For example, the signal processing circuitry 102 of FIG. 1A is configured to produce, in a first contextual mode, an audio signal based on audio data, as described with reference to FIG. 3A.

The method 1300 also includes exchanging, in the first contextual mode, a time indication of a first time with a second device, at 1304. For example, the signal processing circuitry 102 of the hearable D10R of FIG. 1B is configured to send a time indication of a first time via the wireless signal WS20 to the hearable D10L, as described with reference to FIG. 1B. In another example, the signal processing circuitry 102 of the hearable D10R of FIG. 1B is configured to receive a time indication of a first time via the wireless signal WS10 from the hearable D10L, as described with reference to FIG. 1B.

The method 1300 further includes transitioning, at the first time, from the first contextual mode to a second contextual mode based on the time indication, at 1306. For example, the signal processing circuitry 102 of FIG. 1A is configured to transition, at the first time, from the first contextual mode to a second contextual mode based on a signal that indicates the first time, as described with reference to FIG. 3A.

The method 1300 enables the signal processing circuitry 102 at a hearable 100 perform a synchronized mode transition with a second device (e.g., another hearable). For example, the hearable 100 exchanges a time indication of the first time with the second device and transitions from the first contextual mode to the second contextual mode at the first time. The second device may also transition, based on the exchanged time indication, from the first contextual mode to the second contextual mode at the first time. As used herein, "exchanging" a time indication can refer to "sending" the time indication, "receiving" the time indication, or both. In some implementations, the hearable 100 is configured to perform a first mode transition from a first contextual mode to a second contextual mode at a first time, and perform a second mode transition from the second contextual mode to the first contextual mode at a second time. In a particular implementation, the hearable 100 is configured to perform one of the first mode transition or the second mode transition without necessarily performing the other of the first mode transition or the second mode transition. In a particular aspect, one or more of the first mode transition or the second mode transition is synchronized with a second device.

The method 1300 of FIG. 13 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1300 of FIG. 13 may be performed by a processor that executes instructions, such as described with reference to FIG. 14.

Referring to FIG. 14, a block diagram of a particular illustrative implementation of a device is depicted and generally designated 1400. In various implementations, the device 1400 may have more or fewer components than illustrated in FIG. 14. In an illustrative implementation, the device 1400 may correspond to the hearable 100. In an illustrative implementation, the device 1400 may perform one or more operations described with reference to FIGS. 1-13.

In a particular implementation, the device 1400 includes a processor 1406 (e.g., a central processing unit (CPU)). The device 1400 may include one or more additional processors 1410 (e.g., one or more DSPs). The processors 1410 may include a speech and music coder-decoder (CODEC) 1408 that includes a voice coder ("vocoder") encoder 1436, a vocoder decoder 1438, the signal processing circuitry 102, or a combination thereof.

The device 1400 may include a memory 1486 and a CODEC 1434. The memory 1486 may include instructions 1456 that are executable by the one or more additional processors 1410 (or the processor 1406) to implement the functionality described with reference to the signal processing circuitry 102. The device 1400 may include a modem 1470 coupled, via a transceiver 1450, to the antenna 106. In a particular aspect, the modem 1470 is configured to receive a first wireless signal from another device (e.g., another hearable 100) and to transmit a second wireless signal to the other device. In a particular aspect, the modem 1470 is configured to exchange (send or receive) a time indication, a change indication, or both, with another device (e.g., another hearable 100). For example, the modem 1470 is configured to generate modulated data based on the time indication, the change indication, or both, and to provide the modulated data to the antenna 106. The antenna 106 is configured to transmit the modulated data (e.g., to another hearable 100). In another example, the antenna 106 is configured to receive modulated data (e.g., from another hearable 100). The modulated data is based on the time indication, the change indication, or both. The modem 1470 is configured to demodulate the modulated data to determine the time indication, the change indication, or both.

The device 1400 may include a display 1428 coupled to a display controller 1426. The loudspeaker 104, the microphone 108, or both, may be coupled to the CODEC 1434. The CODEC 1434 may include a digital-to-analog converter (DAC) 1402, an analog-to-digital converter (ADC) 1404, or both. In a particular implementation, the CODEC 1434 may receive analog signals from the microphone 108, convert the analog signals to digital signals using the analog-to-digital converter 1404, and provide the digital signals to the speech and music codec 1408. The speech and music codec 1408 may process the digital signals, and the digital signals may further be processed by the signal processing circuitry 102. In a particular implementation, the speech and music codec 1408 may provide digital signals to the CODEC 1434. The CODEC 1434 may convert the digital signals to analog signals using the digital-to-analog converter 1402 and may provide the analog signals to the loudspeaker 104.

In a particular implementation, the device 1400 may be included in a system-in-package or system-on-chip device 1422. In a particular implementation, the memory 1486, the processor 1406, the processors 1410, the display controller 1426, the CODEC 1434, and the modem 1470 are included in a system-in-package or system-on-chip device 1422. In a particular implementation, an input device 1430 and a power supply 1444 are coupled to the system-on-chip device 1422. Moreover, in a particular implementation, as illustrated in FIG. 14, the display 1428, the input device 1430, the loudspeaker 104, the microphone 108, the antenna 106, and the power supply 1444 are external to the system-on-chip device 1422. In a particular implementation, each of the display 1428, the input device 1430, the loudspeaker 104, the microphone 108, the antenna 106, and the power supply 1444 may be coupled to a component of the system-on-chip device 1422, such as an interface or a controller.

The device 1400 may include an earphone, an earbud, a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for producing an audio signal based on audio data, the audio signal produced in a first contextual mode. For example, the means for producing the audio signal can correspond to the signal processing circuitry 102, the loudspeaker 104, the hearable 100 of FIG. 1A, the hearable D10L, the hearable D10R of FIG. 1B, the speech and music codec 1408, the processor 1410, the processor 1406, the CODEC 1434, the device 1400, one or more other circuits or components configured to produce an audio signal, or any combination thereof.

The apparatus also includes means for exchanging a time indication of a first time with a device, the time indication exchanged in the first contextual mode. For example, the means for producing the audio signal can correspond to the signal processing circuitry 102, the antenna 106, the hearable 100 of FIG. 1A, the hearable D10L, the hearable D10R of FIG. 1B, the speech and music codec 1408, the processor 1410, the processor 1406, the modem 1470, the transceiver 1450, the device 1400, one or more other circuits or components configured to exchange the time indication, or any combination thereof.

The apparatus further includes means for transitioning from the first contextual mode to a second contextual mode at the first time. For example, the means for transitioning can correspond to the signal processing circuitry 102, the hearable 100 of FIG. 1A, the hearable D10L, the hearable D10R of FIG. 1B, the speech and music codec 1408, the processor 1410, the processor 1406, the device 1400, one or more other circuits or components configured to produce an audio signal, or any combination thereof.

In some implementations, a non-transitory computer-readable medium (e.g., a computer-readable storage device, such as the memory 1486) includes instructions (e.g., the instructions 1456) that, when executed by one or more processors (e.g., the one or more processors 1410 or the processor 1406), cause the one or more processors to produce, in a first contextual mode (e.g., the ANC mode 402 of FIG. 4), an audio signal based on audio data. The instructions, when executed by the one or more processors, also cause the one or more processors to exchange, in the first contextual mode, a time indication of a first time (e.g., t1 of FIG. 7) with a device (e.g., the hearable D10R of FIG. 1B). The instructions, when executed by the one or more processors, further cause the one or more processors to transition from the first contextual mode to a second contextual mode (e.g., the quiet mode 404 of FIG. 4) at the first time.

Particular aspects of the disclosure are described below in sets of interrelated clauses:

According to Clause 1, a first device is configured to be worn at an ear, the first device includes a processor configured to: in a first contextual mode, produce an audio signal based on audio data; in the first contextual mode, exchange a time indication of a first time with a second device; and at the first time, transition from the first contextual mode to a second contextual mode based on the time indication.

Clause 2 includes the first device of Clause 1, wherein the first contextual mode corresponds to a first operational mode of an active noise cancellation (ANC) filter that is distinct from a second operational mode of the ANC filter corresponding to the second contextual mode.

Clause 3 includes the first device of Clause 1 or Clause 2, wherein active noise cancellation is enabled in the first contextual mode, and wherein the active noise cancellation is disabled in the second contextual mode.

Clause 4 includes the first device of any of Clause 1 to Clause 3, wherein the second contextual mode corresponds to a quiet mode.

Clause 5 includes the first device of any of Clause 1 to Clause 3, wherein the second contextual mode corresponds to a transparency mode.

Clause 6 includes the first device of any of Clause 1 to Clause 5, wherein the processor is configured to: based on detecting a first condition of a microphone signal, cause transmission of a change indication of a change from the first contextual mode to the second contextual mode; and receive an answer to the change indication, wherein the transition from the first contextual mode to the second contextual mode is further based on receiving the answer.

Clause 7 includes the first device of Clause 6, wherein the processor is configured to cause transmission of the time indication concurrently with transmission of the change indication.

Clause 8 includes the first device of Clause 6, wherein the processor is configured to receive the time indication concurrently with receiving the answer.

Clause 9 includes the first device of any of Clause 6 to Clause 8, wherein the processor is configured to detect the first condition based on detecting an environmental noise condition.

Clause 10 includes the first device of any of Clause 6 to Clause 9, wherein the processor is configured to detect the first condition based on determining that environmental noise indicated by the microphone signal remains below a first noise threshold for at least a first threshold time.

Clause 11 includes the first device of any of Clause 6 to Clause 10, wherein the processor is configured to: based on detecting a second condition of the microphone signal, cause transmission of a second change indication of a change from the second contextual mode to the first contextual mode; and at a second time, transition from the second contextual mode to the first contextual mode.

Clause 12 includes the first device of Clause 11, wherein the processor is configured to detect the second condition based on determining that environmental noise indicated by the microphone signal remains above a second noise threshold for at least a second threshold time.

Clause 13 includes the first device of Clause 11 or Clause 12, wherein the processor is configured to receive a second answer to the second change indication, wherein the transition from the second contextual mode to the first contextual mode is based on receiving the second answer.

Clause 14 includes the first device of Clause 11 or Clause 12, wherein the transition from the second contextual mode to the first contextual mode is independent of receiving any answer to the second change indication.

Clause 15 includes the first device of any of Clause 1 to Clause 14, further including one or more antennas configured to send to the second device, or receive from the second device, modulated data based on the time indication.

Clause 16 includes the first device of Clause 15, further including one or more modems coupled to the one or more antennas, the one or more modems configured to demodulate the modulated data to determine the time indication or generate the modulated data based on the time indication.

Clause 17 includes the first device of any of Clause 1 to Clause 16, further including one or more loudspeakers configured to render an anti-noise signal in the first contextual mode.

According to Clause 18, a method includes: producing, at a first device in a first contextual mode, an audio signal based on audio data; exchanging, in the first contextual mode, a time indication of a first time with a second device; and transitioning, at the first device, from the first contextual mode to a second contextual mode at the first time, the transition based on the time indication.

Clause 19 includes the method of Clause 18, wherein the first contextual mode corresponds to a first operational mode of an active noise cancellation (ANC) filter that is distinct from a second operational mode of the ANC filter corresponding to the second contextual mode.

Clause 20 includes the method of Clause 18 or Clause 19, wherein active noise cancellation is enabled in the first contextual mode, and wherein the active noise cancellation is disabled in the second contextual mode.

Clause 21 includes the method of any of Clause 18 to Clause 20, wherein the second contextual mode corresponds to a quiet mode.

Clause 22 includes the method of any of Clause 18 to Clause 20, wherein the second contextual mode corresponds to a transparency mode.

Clause 23 includes the method of any of Clause 18 to Clause 22, further including: based on detecting a first condition of a microphone signal, causing transmission of a change indication of a change from the first contextual mode to the second contextual mode; and receiving, at the first device, an answer to the change indication, wherein transitioning from the first contextual mode to the second contextual mode is further based on receiving the answer.

Clause 24 includes the method of Clause 23, further including causing transmission of the time indication concurrently with transmission of the change indication.

Clause 25 includes the method of Clause 23, further including receiving the time indication concurrently with receiving the answer.

Clause 26 includes the method of any of Clause 23 to Clause 25, further including detecting the first condition based on detecting an environmental noise condition.

Clause 27 includes the method of any of Clause 23 to Clause 26, further including detecting the first condition based on determining that environmental noise indicated by the microphone signal remains below a first noise threshold for at least a first threshold time.

Clause 28 includes the method of any of Clause 23 to Clause 27, further including: based on detecting a second condition of the microphone signal, causing transmission of a second change indication of a change from the second contextual mode to the first contextual mode; and transitioning, at the first device, from the second contextual mode to the first contextual mode at a second time.

Clause 29 includes the method of Clause 28, further including detecting the second condition based on determining that environmental noise indicated by the microphone signal remains above a second noise threshold for at least a second threshold time, the transition based on the time indication.

Clause 30 includes the method of Clause 28 or Clause 29, wherein the processor is configured to receive a second answer to the second change indication, wherein the transition from the second contextual mode to the first contextual mode is based on receiving the second answer.

Clause 31 includes the method of Clause 28 or Clause 29, wherein the transition from the second contextual mode to the first contextual mode is independent of receiving any answer to the second change indication, the transition based on the time indication.

Clause 32 includes the method of any of Clause 18 to Clause 31, further including using one or more antennas to send to the second device, or receive from the second device, modulated data based on the time indication.

Clause 33 includes the method of any of Clause 32, further including using one or more modems to demodulate the modulated data to determine the time indication or generate the modulated data based on the time indication.

Clause 34 includes the method of any of Clause 18 to Clause 33, further including rendering, using one or more loudspeakers, an anti-noise signal in the first contextual mode.

According to Clause 35, a non-transitory computer-readable medium stores instructions that, when executed by a processor, cause the processor to perform the method of any of Clause 18 to Clause 34.

According to Clause 36, an apparatus includes means for carrying out the method of any of Clause 18 to Clause 34.

According to Clause 37, a non-transitory computer-readable medium stores instructions that, when executed by a processor, cause the processor to: produce, in a first contextual mode, an audio signal based on audio data; exchange, in the first contextual mode, a time indication of a first time with a device; and transition from the first contextual mode to a second contextual mode at the first time, the transition based on the time indication.

Clause 38 includes the non-transitory computer-readable medium of Clause 37, wherein the instructions, when executed by the processor, further cause the processor to exchange the time indication with the device based on detecting an environmental noise condition.

Clause 39 includes an apparatus including: means for producing an audio signal based on audio data, the audio signal produced in a first contextual mode; means for exchanging a time indication of a first time with a device, the time indication exchanged in the first contextual mode; and means for transitioning from the first contextual mode to a second contextual mode at the first time, the transition based on the time indication.

Clause 40 includes the apparatus of Clause 39, wherein the means for producing, the means for exchanging, and the means for transitioning are integrated in an earphone.

According to Clause 41, a first device is configured to be worn at an ear, the first device includes a processor configured to: in a first contextual mode, produce an audio signal based on audio data; in the first contextual mode, receive a time indication of a first time from a second device; and at the first time, selectively transition from the first contextual mode to a second contextual mode.

Clause 42 includes the first device of Clause 41, wherein the processor is configured to: in response to receiving the time indication of the first time from the second device, perform a determination whether to transition from the first contextual mode to the second contextual mode; generate an answer based on the determination; and send the answer to the second device, where the selective transition from the first contextual mode to the second contextual mode is based on the determination.

Clause 43 includes the first device of Clause 41 or Clause 42, wherein the first contextual mode corresponds to a first operational mode of an active noise cancellation (ANC) filter that is distinct from a second operational mode of the ANC filter corresponding to the second contextual mode.

Clause 44 includes the first device of any of Clause 41 to Clause 43, wherein active noise cancellation is enabled in the first contextual mode, and wherein the active noise cancellation is disabled in the second contextual mode.

Clause 45 includes the first device of any of Clause 41 to Clause 44, wherein the second contextual mode corresponds to a quiet mode.

Clause 46 includes the first device of any of Clause 41 to Clause 44, wherein the second contextual mode corresponds to a transparency mode.

Clause 47 includes the first device of any of Clause 41 to Clause 46, wherein the processor is configured to: based on detecting a first condition of a microphone signal, cause transmission of a change indication of a change from the first contextual mode to the second contextual mode; and receive an answer to the change indication, wherein the transition from the first contextual mode to the second contextual mode is further based on receiving the answer.

Clause 48 includes the first device of Clause 47, wherein the answer includes the time indication.

Clause 49 includes the first device of Clause 47, wherein the processor is configured to receive the time indication concurrently with receiving the answer.

Clause 50 includes the first device of any of Clause 47 to Clause 49, wherein the processor is configured to detect the first condition based on detecting an environmental noise condition.

Clause 51 includes the first device of any of Clause 47 to Clause 50, wherein the processor is configured to detect the first condition based on determining that environmental noise indicated by the microphone signal remains below a first noise threshold for at least a first threshold time.

Clause 52 includes the first device of any of Clause 47 to Clause 51, wherein the processor is configured to: based on detecting a second condition of the microphone signal, cause transmission of a second change indication of a change from the second contextual mode to the first contextual mode; and at a second time, transition from the second contextual mode to the first contextual mode.

Clause 53 includes the first device of Clause 52, wherein the processor is configured to detect the second condition based on determining that environmental noise indicated by the microphone signal remains above a second noise threshold for at least a second threshold time.

Clause 54 includes the first device of Clause 52 or Clause 53, wherein the processor is configured to receive a second answer to the second change indication, wherein the transition from the second contextual mode to the first contextual mode is based on receiving the second answer.

Clause 55 includes the first device of Clause 52 or Clause 53, wherein the transition from the second contextual mode to the first contextual mode is independent of receiving any answer to the second change indication.

Clause 56 includes the first device of any of Clause 41 to Clause 55, further including one or more antennas configured to receive, from the second device, modulated data based on the time indication.

Clause 57 includes the first device of Clause 56, further including one or more modems coupled to the one or more antennas, the one or more modems configured to demodulate the modulated data to determine the time indication.

Clause 58 includes the first device of any of Clause 41 to Clause 57, further including one or more loudspeakers configured to render an anti-noise signal in the first contextual mode.

Clause 59 includes the first device of any of Clause 41 to Clause 58, further including a microphone configured to generate a microphone signal, the transition from the first contextual mode to the second contextual mode based at least in part on the microphone signal.

According to Clause 60, a system includes a plurality of devices, each of the plurality of devices corresponds to the first device of any of Clause 41 to Clause 59, and is configured to selectively transition from the first contextual mode to the second contextual mode at the first time.

According to Clause 61, a first device is configured to be worn at an ear, the first device includes a processor configured to: in a first contextual mode, produce an audio signal based on audio data; in the first contextual mode, generate a time indication of a first time; and transmit the time indication to the second device to cause the second device to transition, at the first time, from the first contextual mode to a second contextual mode.

Clause 62 includes the first device of Clause 61, wherein the processor is configured to: receive an answer from the second device indicating whether the second device is to transition, at the first time, from the first contextual mode to the second contextual mode; and selectively transition from the first contextual mode to the second contextual mode based on the answer.

Clause 63 includes the first device of Clause 61 or Clause 62, wherein the first contextual mode corresponds to a first operational mode of an active noise cancellation (ANC) filter that is distinct from a second operational mode of the ANC filter corresponding to the second contextual mode.

Clause 64 includes the first device of any of Clause 61 to Clause 63, wherein active noise cancellation is enabled in the first contextual mode, and wherein the active noise cancellation is disabled in the second contextual mode.

Clause 65 includes the first device of any of Clause 61 to Clause 64, wherein the second contextual mode corresponds to a quiet mode.

Clause 66 includes the first device of any of Clause 61 to Clause 64, wherein the second contextual mode corresponds to a transparency mode.

Clause 67 includes the first device of any of Clause 61 to Clause 66, wherein the processor is configured to: based on detecting a first condition of a microphone signal, cause transmission of a change indication of a change from the first contextual mode to the second contextual mode; and receive an answer to the change indication, wherein the transition from the first contextual mode to the second contextual mode is further based on receiving the answer.

Clause 68 includes the first device of Clause 67, wherein the change indication includes the time indication.

Clause 69 includes the first device of Clause 67, wherein the processor is configured to transmit the time indication concurrently with transmitting the change indication.

Clause 70 includes the first device of any of Clause 67 to Clause 69, wherein the processor is configured to detect the first condition based on detecting an environmental noise condition.

Clause 71 includes the first device of any of Clause 67 to Clause 70, wherein the processor is configured to detect the first condition based on determining that environmental noise indicated by the microphone signal remains below a first noise threshold for at least a first threshold time.

Clause 72 includes the first device of any of Clause 67 to Clause 71, wherein the processor is configured to: based on detecting a second condition of the microphone signal, cause transmission of a second change indication of a change from the second contextual mode to the first contextual mode; and at a second time, transition from the second contextual mode to the first contextual mode.

Clause 73 includes the first device of Clause 72, wherein the processor is configured to detect the second condition based on determining that environmental noise indicated by the microphone signal remains above a second noise threshold for at least a second threshold time.

Clause 74 includes the first device of Clause 72 or Clause 73, wherein the processor is configured to receive a second answer to the second change indication, wherein the transition from the second contextual mode to the first contextual mode is based on receiving the second answer.

Clause 75 includes the first device of Clause 72 or Clause 73, wherein the transition from the second contextual mode to the first contextual mode is independent of receiving any answer to the second change indication.

Clause 76 includes the first device of any of Clause 61 to Clause 75, further including one or more antennas configured to transmit modulated data to the second device, the modulated data based on the time indication.

Clause 77 includes the first device of Clause 76, further including one or more modems configured to generate the modulated data based on the time indication.

Clause 78 includes the first device of any of Clause 61 to Clause 77, further including one or more loudspeakers configured to render an anti-noise signal in the first contextual mode.

Clause 79 includes the first device of any of Clause 61 to Clause 78, further including a microphone configured to generate a microphone signal, the transition from the first contextual mode to the second contextual mode based at least in part on the microphone signal.

According to Clause 80, a system includes: a first device including a first processor configured to: generate a time indication of a first time; and transmit the time indication to a second device to cause the second device to transition, at the first time, from a first contextual mode to a second contextual mode; and the second device configured to be worn at an ear and including a second processor configured to: in the first contextual mode, produce an audio signal based on audio data; in the first contextual mode, receive the time indication of the first time from the first device; and at the first time, selectively transition from the first contextual mode to the second contextual mode.

Clause 81 includes the system of Clause 80, wherein the second processor of the second device is configured to: in response to receiving the time indication of the first time from the first device, perform a determination whether to transition from the first contextual mode to the second contextual mode; generate an answer based on the determination; transmit the answer to the first device; and selectively transition from the first contextual mode to the second contextual mode based on the determination; and wherein the first processor of the first device is configured to: receive the answer from the second device; and selectively transition from the first contextual mode to the second contextual mode based on the answer.

Clause 82 includes the system of Clause 80 or Clause 81, wherein the first contextual mode corresponds to a first operational mode of an active noise cancellation (ANC) filter that is distinct from a second operational mode of the ANC filter corresponding to the second contextual mode.

Clause 83 includes the system of any of Clause 80 to Clause 82, wherein active noise cancellation is enabled in the first contextual mode, and wherein the active noise cancellation is disabled in the second contextual mode.

Clause 84 includes the system of any of Clause 80 to Clause 83, wherein the second contextual mode corresponds to a quiet mode.

Clause 85 includes the system of any of Clause 80 to Clause 83, wherein the second contextual mode corresponds to a transparency mode.

Clause 86 includes the system of any of Clause 80 to Clause 85, wherein the first processor of the first device is configured to: based on detecting a first condition of a microphone signal, cause transmission of a change indication of a change from the first contextual mode to the second contextual mode; and receive an answer to the change indication, wherein the transition from the first contextual mode to the second contextual mode is further based on receiving the answer.

Clause 87 includes the system of Clause 86, wherein the change indication includes the time indication.

Clause 88 includes the system of Clause 86, wherein the first processor of the first device is configured to transmit the time indication concurrently with transmitting the change indication.

Clause 89 includes the system of any of Clause 86 to Clause 88, wherein the first processor of the first device is configured to detect the first condition based on detecting an environmental noise condition.

Clause 90 includes the system of any of Clause 86 to Clause 89, wherein the first processor of the first device is configured to detect the first condition based on determining that environmental noise indicated by the microphone signal remains below a first noise threshold for at least a first threshold time.

Clause 91 includes the system of any of Clause 86 to Clause 90, wherein the first processor of the first device is configured to: based on detecting a second condition of the microphone signal, cause transmission of a second change indication of a change from the second contextual mode to the first contextual mode; and at a second time, transition from the second contextual mode to the first contextual mode.

Clause 92 includes the system of Clause 91, wherein the first processor of the first device is configured to detect the second condition based on determining that environmental noise indicated by the microphone signal remains above a second noise threshold for at least a second threshold time.

Clause 93 includes the system of Clause 91 or Clause 92, wherein the first processor of the first device is configured to receive a second answer to the second change indication, wherein the transition from the second contextual mode to the first contextual mode is based on receiving the second answer.

Clause 94 includes the system of Clause 91 or Clause 92, wherein the transition from the second contextual mode to the first contextual mode is independent of receiving any answer to the second change indication.

Clause 95 includes the system of any of Clause 80 to Clause 94, wherein the first device includes one or more antennas configured to transmit modulated data to the second device, the modulated data based on the time indication.

Clause 96 includes the system of Clause 95, wherein the first device includes one or more modems coupled to the one or more antennas, the one or more modems configured to generate the modulated data based on the time indication.

Clause 97 includes the system of any of Clause 80 to Clause 96, wherein the first device includes one or more loudspeakers configured to render an anti-noise signal in the first contextual mode.

Clause 98 includes the system of any of Clause 80 to Clause 97, wherein the first device includes a microphone configured to generate a microphone signal, the transition from the first contextual mode to the second contextual mode based at least in part on the microphone signal.

According to Clause 99, a method includes: producing, at a first device in a first contextual mode, an audio signal based on audio data; receiving a time indication of a first time from a second device; and selectively transitioning, at the first time, from the first contextual mode to a second contextual mode.

Clause 100 includes the method of Clause 99, further including: in response to receiving the time indication of the first time from the second device, performing a determination whether to transition from the first contextual mode to the second contextual mode; generating an answer based on the determination; and sending the answer to the second device, where the selective transition from the first contextual mode to the second contextual mode is based on the determination.

Clause 101 includes the method of Clause 99 or Clause 100, wherein the first contextual mode corresponds to a first operational mode of an active noise cancellation (ANC) filter that is distinct from a second operational mode of the ANC filter corresponding to the second contextual mode.

Clause 102 includes the method of any of Clause 99 to Clause 101, wherein active noise cancellation is enabled in the first contextual mode, and wherein the active noise cancellation is disabled in the second contextual mode.

Clause 103 includes the method of any of Clause 99 to Clause 102, wherein the second contextual mode corresponds to a quiet mode.

Clause 104 includes the method of any of Clause 99 to Clause 102, wherein the second contextual mode corresponds to a transparency mode.

Clause 105 includes the method of any of Clause 99 to Clause 104, further including: based on detecting a first condition of a microphone signal, causing transmission of a change indication of a change from the first contextual mode to the second contextual mode; and receiving an answer to the change indication, where the transition from the first contextual mode to the second contextual mode is further based on receiving the answer.

Clause 106 includes the method of Clause 105, wherein the answer includes the time indication.

Clause 107 includes the method of Clause 105, further including receiving the time indication concurrently with receiving the answer.

Clause 108 includes the method of any of Clause 105 to Clause 107, further including detecting the first condition based on detecting an environmental noise condition.

Clause 109 includes the method of any of Clause 105 to Clause 108, further including detecting the first condition based on determining that environmental noise indicated by the microphone signal remains below a first noise threshold for at least a first threshold time.

Clause 110 includes the method of any of Clause 105 to Clause 109, further including: based on detecting a second condition of the microphone signal, causing transmission of a second change indication of a change from the second contextual mode to the first contextual mode; and at a second time, transition from the second contextual mode to the first contextual mode.

Clause 111 includes the method of Clause 110, further including detecting the second condition based on determining that environmental noise indicated by the microphone signal remains above a second noise threshold for at least a second threshold time.

Clause 112 includes the method of Clause 110 or Clause 111, further including receiving a second answer to the second change indication, where the transition from the second contextual mode to the first contextual mode is based on receiving the second answer.

Clause 113 includes the method of Clause 110 or Clause 111, where the transition from the second contextual mode to the first contextual mode is independent of receiving any answer to the second change indication.

Clause 114 includes the method of any of Clause 99 to Clause 113, further including using one or more antennas to receive modulated data from the second device, the modulated data based on the time indication.

Clause 115 includes the method of Clause 114, further including using one or more modems configured to demodulate the modulated data to determine the time indication.

Clause 116 includes the method of any of Clause 99 to Clause 115, further including rendering, via one or more loudspeakers, an anti-noise signal in the first contextual mode.

Clause 117 includes the method of any of Clause 99 to Clause 116, further including using a microphone to generate a microphone signal, the transition from the first contextual mode to the second contextual mode based at least in part on the microphone signal.

According to Clause 118, a non-transitory computer-readable medium stores instructions that, when executed by a processor, cause the processor to perform the method of any of Clause 99 to Clause 117.

According to Clause 119, an apparatus includes means for carrying out the method of any of Clause 99 to Clause 117.

According to Clause 120, a method includes: producing, at a first device in a first contextual mode, an audio signal based on audio data; generating a time indication of a first time; and transmitting the time indication to the second device to cause the second device to transition, at the first time, from the first contextual mode to a second contextual mode.

Clause 121 includes the method of Clause 120, further including: receiving an answer from the second device indicating whether the second device is to transition, at the first time, from the first contextual mode to the second contextual mode; and selectively transitioning from the first contextual mode to the second contextual mode based on the answer.

Clause 122 includes the method of Clause 120 or Clause 121, where the first contextual mode corresponds to a first operational mode of an active noise cancellation (ANC) filter that is distinct from a second operational mode of the ANC filter corresponding to the second contextual mode.

Clause 123 includes the method of any of Clause 120 to Clause 122, where active noise cancellation is enabled in the first contextual mode, and wherein the active noise cancellation is disabled in the second contextual mode.

Clause 124 includes the method of any of Clause 120 to Clause 123, where the second contextual mode corresponds to a quiet mode.

Clause 125 includes the method of any of Clause 120 to Clause 123, where the second contextual mode corresponds to a transparency mode.

Clause 126 includes the method of any of Clause 120 to Clause 125, further including: based on detecting a first condition of a microphone signal, causing transmission of a change indication of a change from the first contextual mode to the second contextual mode; and receiving an answer to the change indication, where the transition from the first contextual mode to the second contextual mode is further based on receiving the answer.

Clause 127 includes the method of Clause 126, where the change indication includes the time indication.

Clause 128 includes the method of Clause 126, further including transmitting the time indication concurrently with transmitting the change indication.

Clause 129 includes the method of any of Clause 126 to Clause 128, further including detecting the first condition based on detecting an environmental noise condition.

Clause 130 includes the method of any of Clause 126 to Clause 129, further including detecting the first condition based on determining that environmental noise indicated by the microphone signal remains below a first noise threshold for at least a first threshold time.

Clause 131 includes the method of any of Clause 126 to Clause 130, further including: based on detecting a second condition of the microphone signal, causing transmission of a second change indication of a change from the second contextual mode to the first contextual mode; and at a second time, transitioning from the second contextual mode to the first contextual mode.

Clause 132 includes the method of Clause 131, further including detecting the second condition based on determining that environmental noise indicated by the microphone signal remains above a second noise threshold for at least a second threshold time.

Clause 133 includes the method of Clause 131 or Clause 132, further including receiving a second answer to the second change indication, where the transition from the second contextual mode to the first contextual mode is based on receiving the second answer.

Clause 134 includes the method of Clause 131 or Clause 132, wherein the transition from the second contextual mode to the first contextual mode is independent of receiving any answer to the second change indication.

Clause 135 includes the method of any of Clause 120 to Clause 134, further including using one or more antennas to transmit modulated data to the second device, the modulated data based on the time indication.

Clause 136 includes the method of Clause 135, further including using one or more modems to generate the modulated data based on the time indication.

Clause 137 includes the method of any of Clause 120 to Clause 136, further including rendering, via one or more loudspeakers, an anti-noise signal in the first contextual mode.

Clause 138 includes the method of any of Clause 120 to Clause 137, further including using a microphone to generate a microphone signal, the transition from the first contextual mode to the second contextual mode based at least in part on the microphone signal.

According to Clause 139, a non-transitory computer-readable medium stores instructions that, when executed by a processor, cause the processor to perform the method of any of Clause 120 to Clause 138.

According to Clause 140, an apparatus includes means for carrying out the method of any of Clause 120 to Clause 138.

According to Clause 141, a method includes: generating, at a first device, a time indication of a first time; transmitting the time indication from the first device to a second device to cause the second device to transition, at the first time, from a first contextual mode to a second contextual mode; producing, at the second device in the first contextual mode, an audio signal based on audio data; receiving, at the second device, the time indication of the first time from the first device; and selectively transitioning, at the first time, from the first contextual mode to the second contextual mode at the second device.

Clause 142 includes the method of Clause 141, further including: in response to receiving the time indication of the first time at the second device from the first device, performing a determination, at the second device, whether to transition from the first contextual mode to the second contextual mode; generating, at the second device, an answer based on the determination; transmitting the answer from the second device to the first device; selectively transitioning from the first contextual mode to the second contextual mode at the second device based on the determination; receiving the answer at the first device from the second device; and selectively transition from the first contextual mode to the second contextual mode at the first device based on the answer.

Clause 143 includes the method of Clause 141 or Clause 142, where the first contextual mode corresponds to a first operational mode of an active noise cancellation (ANC) filter that is distinct from a second operational mode of the ANC filter corresponding to the second contextual mode.

Clause 144 includes the method of any of Clause 141 to Clause 143, where active noise cancellation is enabled in the first contextual mode, and where the active noise cancellation is disabled in the second contextual mode.

Clause 145 includes the method of any of Clause 141 to Clause 144, where the second contextual mode corresponds to a quiet mode.

Clause 146 includes the method of any of Clause 141 to Clause 144, where the second contextual mode corresponds to a transparency mode.

Clause 147 includes the method of any of Clause 141 to Clause 146, further including: based on detecting, at a first device, a first condition of a microphone signal, causing transmission of a change indication of a change from the first contextual mode to the second contextual mode; and receiving, at the first device, an answer to the change indication, where the transition from the first contextual mode to the second contextual mode is further based on receiving the answer.

Clause 148 includes the method of Clause 147, wherein the change indication includes the time indication.

Clause 149 includes the method of Clause 147, further including transmitting the time indication from the first device concurrently with transmitting the change indication from the first device.

Clause 150 includes the method of any of Clause 147 to Clause 149, further including detecting, at the first device, the first condition based on detecting an environmental noise condition.

Clause 151 includes the method of any of Clause 147 to Clause 150, further including detecting, at the first device, the first condition based on determining that environmental noise indicated by the microphone signal remains below a first noise threshold for at least a first threshold time.

Clause 152 includes the method of any of Clause 147 to Clause 151, further including: based on detecting, at the first device, a second condition of the microphone signal, causing transmission, from the first device, of a second change indication of a change from the second contextual mode to the first contextual mode; and at a second time, transitioning from the second contextual mode to the first contextual mode at the first device.

Clause 153 includes the method of Clause 152, further including detecting, at the first device, the second condition based on determining that environmental noise indicated by the microphone signal remains above a second noise threshold for at least a second threshold time.

Clause 154 includes the method of Clause 152 or Clause 153, further including receiving, at the first device, a second answer to the second change indication, where the transition from the second contextual mode to the first contextual mode at the first device is based on receiving the second answer.

Clause 155 includes the method of Clause 152 or Clause 153, where the transition from the second contextual mode to the first contextual mode at the first device is independent of receiving any answer to the second change indication.

Clause 156 includes the method of any of Clause 141 to Clause 155, further including using one or more antennas to transmit modulated data from the first device to the second device, the modulated data based on the time indication.

Clause 157 includes the method of Clause 156, further including using one or more modems at the first device to generate the modulated data based on the time indication.

Clause 158 includes the method of any of Clause 141 to Clause 157, further including rendering, via one or more loudspeakers, an anti-noise signal in the first contextual mode at the first device.

Clause 159 includes the method of any of Clause 141 to Clause 158, further including using a microphone configured to generate a microphone signal, the transition from the first contextual mode to the second contextual mode at the first device based at least in part on the microphone signal.

According to Clause 160, a non-transitory computer-readable medium stores instructions that, when executed by a processor, cause the processor to perform the method of any of Clause 141 to Clause 159.

According to Clause 161, an apparatus includes means for carrying out the method of any of Clause 141 to Clause 159.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

The terms "coder," "codec," and "coding system" are used interchangeably to denote a system that includes at least one encoder configured to receive and encode frames of an audio signal (possibly after one or more pre-processing operations, such as a perceptual weighting and/or other filtering operation) and a corresponding decoder configured to produce decoded representations of the frames. Such an encoder and decoder are typically deployed at opposite terminals of a communications link. The term "signal component" is used to indicate a constituent part of a signal, which signal may include other signal components. The term "audio content from a signal" is used to indicate an expression of audio information that is carried by the signal.

The various elements of an implementation of an apparatus or system as disclosed herein may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 or M200 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A first device configured to be worn at an ear, the first device comprising a processor configured to:

in a first contextual mode, produce an audio signal based on audio data;

in the first contextual mode, exchange a time indication of a first time with a second device, wherein the time indication is exchanged based on detection of a first condition of a microphone signal; and at the first time, transition from the first contextual mode to a second contextual mode based on the time indication.

2. The first device of claim 1, wherein the first contextual mode corresponds to a first operational mode of an active noise cancellation (ANC) filter that is distinct from a second operational mode of the ANC filter corresponding to the second contextual mode.

3. The first device of claim 1, wherein the first condition is detected based on detecting that the microphone signal corresponds to a user voice captured by an external microphone.

4. The first device of claim 1, wherein active noise cancellation is enabled in the first contextual mode, and wherein the second contextual mode corresponds to a transparency mode.

5. The first device of claim 1, wherein the first condition is detected based on detecting that the microphone signal corresponds to greater than threshold wind noise.

6. The first device of claim 1, wherein the first contextual mode corresponds to an active noise cancellation (ANC) enabled mode, and wherein the second contextual mode corresponds to an ANC disabled mode.

7. The first device of claim 1, wherein the processor is configured to:

based on detecting the first condition of the microphone signal, cause transmission of a change indication of a change from the first contextual mode to the second contextual mode; and receive an answer to the change indication, wherein the transition from the first contextual mode to the second contextual mode is further based on receiving the answer.

8. The first device of claim 7, wherein the processor is configured to cause transmission of the time indication concurrently with transmission of the change indication.

9. The first device of claim 7, wherein the processor is configured to receive the time indication concurrently with receiving the answer.

10. The first device of claim 7, wherein the processor is configured to detect the first condition based on determining that environmental noise indicated by the microphone signal remains below a first noise threshold for at least a first threshold time.

11. The first device of claim 7, wherein the processor is configured to:

based on detecting a second condition of the microphone signal, cause transmission of a second change indication of a change from the second contextual mode to the first contextual mode; and at a second time, transition from the second contextual mode to the first contextual mode.

12. The first device of claim 11, wherein the processor is configured to detect the second condition based on determining that environmental noise indicated by the microphone signal remains above a second noise threshold for at least a second threshold time.

13. The first device of claim 11, wherein the processor is configured to receive a second answer to the second change indication, wherein the transition from the second contextual mode to the first contextual mode is based on receiving the second answer.

14. The first device of claim 11, wherein the transition from the second contextual mode to the first contextual mode is independent of receiving any answer to the second change indication.

15. The first device of claim 1, further comprising one or more antennas configured to send to the second device, or receive from the second device, modulated data based on the time indication.

16. The first device of claim 15, further comprising one or more modems coupled to the one or more antennas, the one or more modems configured to demodulate the modulated data to determine the time indication or generate the modulated data based on the time indication.

17. The first device of claim 1, further comprising one or more loudspeakers configured to render an anti-noise signal in the first contextual mode.

18. A method comprising:

producing, at a first device in a first contextual mode, an audio signal based on audio data;

exchanging, in the first contextual mode, a time indication of a first time with a second device, wherein the time indication is exchanged based on detection of a first condition of a microphone signal; and transitioning, at the first device, from the first contextual mode to a second contextual mode at the first time, the transition based on the time indication.

19. The method of claim 18, wherein the first contextual mode corresponds to a first operational mode of an active noise cancellation (ANC) filter that is distinct from a second operational mode of the ANC filter corresponding to the second contextual mode.

20. The method of claim 18, wherein active noise cancellation is enabled in the first contextual mode, and wherein the second contextual mode corresponds to a transparency mode.

21. The method of claim 18, wherein the first condition is detected based on detecting that the microphone signal corresponds to a user voice captured by an external microphone.

22. The method of claim 18, wherein the first condition is detected based on detecting that the microphone signal corresponds to greater than threshold wind noise.

23. The method of claim 18, further comprising:

based on detecting the first condition of the microphone signal, causing transmission of a change indication of a change from the first contextual mode to the second contextual mode; and receiving, at the first device, an answer to the change indication, wherein transitioning from the first contextual mode to the second contextual mode is further based on receiving the answer.

24. The method of claim 23, further comprising causing transmission of the time indication concurrently with transmission of the change indication.

25. The method of claim 23, further comprising receiving the time indication concurrently with receiving the answer.

26. The method of claim 23, further comprising detecting the first condition based on detecting an environmental noise condition.

27. A non-transitory computer-readable medium storing instructions that, when executed by a processor, cause the processor to:

produce, in a first contextual mode, an audio signal based on audio data;

exchange, in the first contextual mode, a time indication of a first time with a device, wherein the time indication is exchanged based on detection of a first condition of a microphone signal; and transition from the first contextual mode to a second contextual mode at the first time, the transition based on the time indication.

28. The non-transitory computer-readable medium of claim 27, wherein the instructions, when executed by the processor, further cause the processor to detect the first condition based on determining that a level of low-frequency noise in the microphone signal exceeds a threshold.

29. An apparatus comprising:

means for producing an audio signal based on audio data, the audio signal produced in a first contextual mode;

means for exchanging a time indication of a first time with a device, the time indication exchanged in the first contextual mode, wherein the time indication is exchanged based on detection of a first condition of a microphone signal; and means for transitioning from the first contextual mode to a second contextual mode at the first time, the transition based on the time indication.

30. The apparatus of claim 29, wherein the means for producing, the means for exchanging, and the means for transitioning are integrated in an earphone.

* * * * *